US012631566B2

(12) United States Patent
Horita

(10) Patent No.: US 12,631,566 B2
(45) Date of Patent: May 19, 2026

(54) INSPECTION SUPPORT DEVICE, INSPECTION SUPPORT METHOD, AND PROGRAM

(71) Applicant: FUJIFILM Corporation, Tokyo (JP)

(72) Inventor: Shuhei Horita, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 88 days.

(21) Appl. No.: 18/606,782

(22) Filed: Mar. 15, 2024

(65) Prior Publication Data

US 2024/0219312 A1 Jul. 4, 2024

Related U.S. Application Data

(63) Continuation of application No. PCT/JP2022/029312, filed on Jul. 29, 2022.

(30) Foreign Application Priority Data

Sep. 30, 2021 (JP) ................................ 2021-161060

(51) Int. Cl.
*G01N 21/88* (2006.01)
*G06T 7/00* (2017.01)
(Continued)

(52) U.S. Cl.
CPC ......... *G01N 21/8851* (2013.01); *G06T 7/001* (2013.01); *G06T 11/203* (2013.01); (Continued)

(58) Field of Classification Search
CPC .. G01N 21/8851; G06V 10/759; G06V 10/86; G06T 7/001; G06T 11/203; G06T 2207/20081
See application file for complete search history.

(56) References Cited

U.S. PATENT DOCUMENTS

2018/0292329 A1 10/2018 Karube
2023/0162348 A1* 5/2023 Moteki ................... G06T 19/20
345/419

FOREIGN PATENT DOCUMENTS

JP 2007-179340 A 7/2007
JP 2019-175015 A 10/2019
(Continued)

OTHER PUBLICATIONS

International Search Report issued in PCT/JP2022/029312; mailed Oct. 11, 2022.
(Continued)

*Primary Examiner* — Kevin K Pyo
(74) *Attorney, Agent, or Firm* — Studebaker Brackett PLLC

(57) ABSTRACT

Provided are an inspection support device, an inspection support method, and a program capable of reducing complexity of creating a damage diagram. The inspection support device includes a processor that supports creation of a damage diagram of a structure, in which the processor acquires image data of information including a structural drawing of a target structure on a medium and damage information related to damage added by a user on the medium, recognizes the damage information by image recognition from the acquired image data, acquires drawing data corresponding to the structural drawing, aligns the structural drawing of the image data with the drawing data, and draws the damage information as a damage graphic at a corresponding position of the drawing data to create the damage diagram.

32 Claims, 19 Drawing Sheets

(51) Int. Cl.
G06T 11/20 (2006.01)
G06V 10/75 (2022.01)
G06V 10/86 (2022.01)

(52) U.S. Cl.
CPC ............ G06V 10/759 (2022.01); G06V 10/86 (2022.01); G06T 2207/20081 (2013.01)

(56) References Cited

FOREIGN PATENT DOCUMENTS

| | | |
|---|---|---|
| JP | 2020-160056 A | 10/2020 |
| JP | 2021-101190 A | 7/2021 |

OTHER PUBLICATIONS

International Preliminary Report On Patentability (Chapter I) and Written Opinion of the International Searching Authority issued in PCT/JP2022/029312; issued Apr. 2, 2024.
"Notice of Reasons for Refusal" Office Action issued in JP 2023-550417; mailed by the Japanese Patent Office on Nov. 25, 2025.

* cited by examiner

Figures 2, 3:
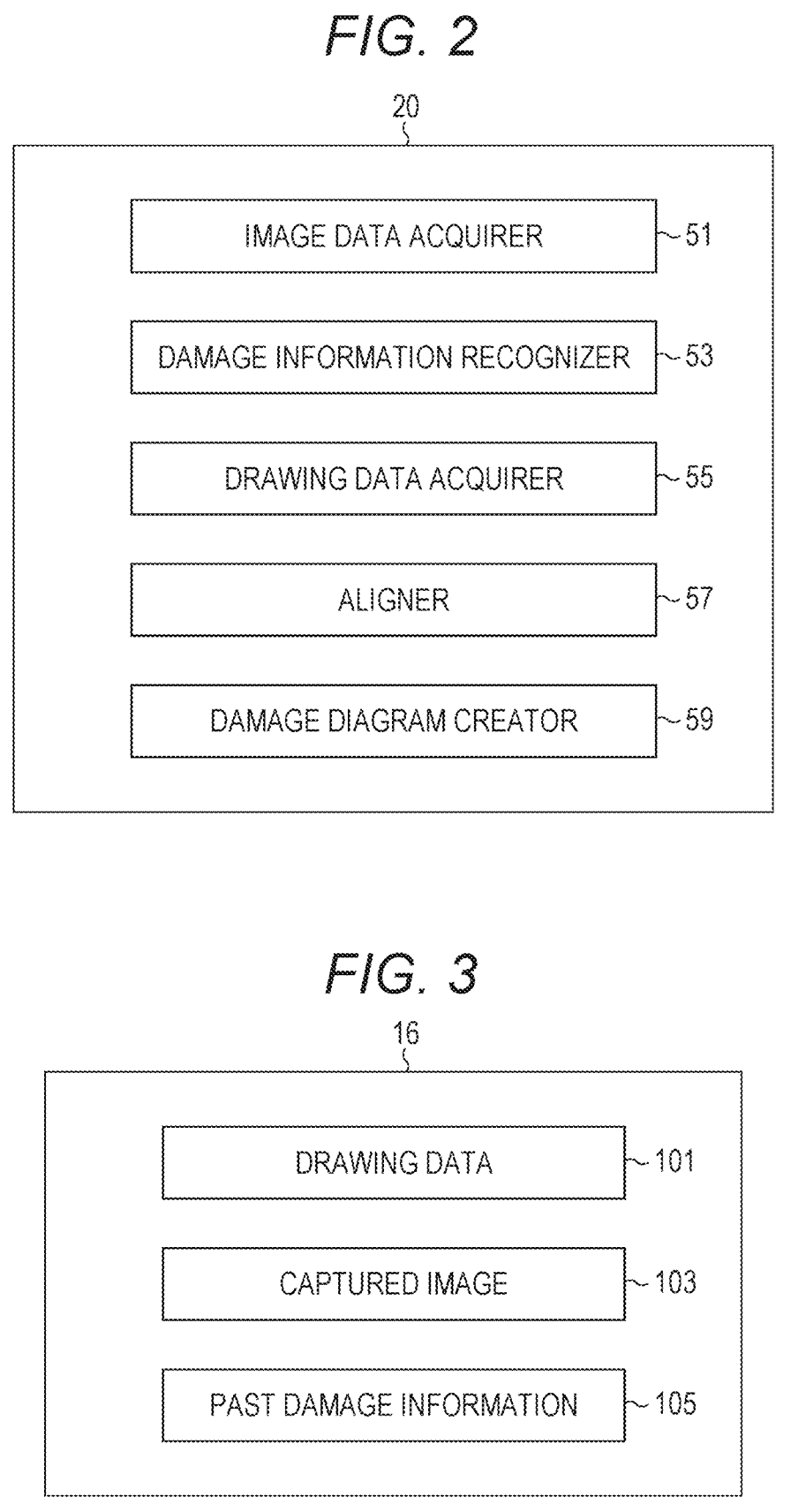

| IMAGE DATA ACQUIRER | ~51 |
| DAMAGE INFORMATION RECOGNIZER | ~53 |
| DRAWING DATA ACQUIRER | ~55 |
| ALIGNER | ~57 |
| DAMAGE DIAGRAM CREATOR | ~59 |

| DRAWING DATA | ~101 |
| CAPTURED IMAGE | ~103 |
| PAST DAMAGE INFORMATION | ~105 |

*FIG. 11*

| DAMAGE TYPE | PATTERN | DAMAGE TYPE | PATTERN |
|---|---|---|---|
| PEELING | | WATER LEAKAGE | |
| REINFORCEMENT EXPOSURE | | OTHERS | |
| FREE LIME | | FLOATING | |

INSPECTION SUPPORT DEVICE, INSPECTION SUPPORT METHOD, AND PROGRAM

CROSS-REFERENCE TO RELATED APPLICATIONS

The present application is a Continuation of PCT International Application No. PCT/JP2022/029312 filed on Jul. 29, 2022 claiming priority under 35 U.S.C § 119(a) to Japanese Patent Application No. 2021-161060 filed on Sep. 30, 2021. Each of the above applications is hereby expressly incorporated by reference, in its entirety, into the present application.

BACKGROUND OF THE INVENTION

1. Field of the Invention

The present invention relates to an inspection support device, an inspection support method, and a program for a structure.

2. Description of the Related Art

As a social infrastructure, there are structures such as bridges and tunnels. Since damage occurs in these structures and the damage has a progressive nature, the structures are required to be periodically inspected. An inspector who has inspected the structure creates an inspection report in a predetermined format as a form indicating the result of the inspection. JP2007-179340A discloses that a mark, a leader line, and desired character information are handwritten on a form on which a steel structure is printed, the form is converted into image data by a scanner, and electronic data in which the mark of the steel structure and a state, a degree, and treatment of the marked portion are connected to each other is obtained.

SUMMARY OF THE INVENTION

However, in a case where a damage diagram illustrating a damaged state of a structure which is one inspection report is created, for example, a printed matter (so-called field notebook) of a drawing including a structural drawing of a target structure is prepared based on a design drawing or CAD data, a defect such as a crack is noted on the printed matter of the drawing by handwriting at an inspection site of the structure, and after the inspection, it is necessary to create the damage diagram (CAD drawing) while viewing the field notebook and a captured image to which the defect or the like is added at an office. Therefore, there is a problem that the work is complex.

The present invention has been made in view of such circumstances, and an object of the present invention is to provide an inspection support device, an inspection support method, and a program capable of reducing complexity of creating a damage diagram.

An inspection support device according to a first aspect comprising a processor that supports creation of a damage diagram of a structure,
in which the processor
acquires image data of information including a structural drawing of a target structure on a medium and damage information related to damage added by a user on the medium, recognizes the damage information by image recognition from the acquired image data,
acquires drawing data corresponding to the structural drawing,
aligns the structural drawing of the image data with the drawing data, and
draws the damage information as a damage graphic at a corresponding position of the drawing data to create the damage diagram.
In a second aspect, the processor
associates the damage graphic with a character string.
In a third aspect, the processor receives editing of the created damage diagram and permits the editing of the damage diagram.
In a fourth aspect, the processor
vectorizes and draws the damage graphic.
In a fifth aspect, the processor
recognizes the damage information from the image data by the image recognition by at least one of a machine learning model or an image recognition algorithm.
In a sixth aspect, the processor
calculates an actual dimension of the damage from the damage graphic and dimension information included in the drawing data.
In a seventh aspect, the processor
recognizes additional attribute information included in the information from the image data by character recognition.
In an eighth aspect, the processor
associates the damage information with the additional attribute information based on a predetermined condition.
In a ninth aspect, the information includes auxiliary information that specifies the additional attribute information, and the processor specifies a position of the additional attribute information based on the auxiliary information.
In a tenth aspect, the information includes captured image identification information of a captured image obtained by imaging the target structure, and
the processor
acquires the captured image from the captured image identification information, and
acquires complementary information that complements the damage information from the captured image.
In an eleventh aspect, past damage information of the target structure in the past is included on the medium, and
the processor
draws a difference between the damage information and the past damage information as the damage graphic based on the damage information and the past damage information.
An inspection support method of supporting creation of a damage diagram of a structure by a processor according to a twelfth aspect, the inspection support method comprising:
by the processor,
a step of acquiring image data of information including a structural drawing of a target structure on a medium and damage information added by a user on the medium;
a step of recognizing the damage information from the acquired image data;
a step of acquiring drawing data corresponding to the structural drawing;
a step of aligning the structural drawing of the image data with the drawing data; and a step of drawing the damage information as a damage graphic at a corresponding position of the drawing data to create the damage diagram.

A program that causes a processor according to a thirteenth aspect to execute an inspection support method of supporting creation of a damage diagram of a structure, the program causing the processor to execute:

a step of acquiring image data of information including a structural drawing of a target structure on a medium and damage information added by a user on the medium;

a step of recognizing the damage information from the acquired image data;

a step of acquiring drawing data corresponding to the structural drawing;

a step of aligning the structural drawing of the image data with the drawing data; and a step of drawing the damage information as a damage graphic at a corresponding position of the drawing data to create a damage diagram.

The inspection support device, the inspection support method, and the program according to an embodiment of the present invention can reduce complexity of creating a damage diagram.

BRIEF DESCRIPTION OF THE DRAWINGS

FIG. 2 is a block diagram showing processing functions implemented by a CPU.

FIG. 3 is a diagram showing information and the like stored in a storage.

FIG. 11 is an explanatory diagram showing a relationship between a damage type and a sketch pattern of regional damage.

DESCRIPTION OF THE PREFERRED EMBODIMENTS

Hereinafter, preferred embodiments of an inspection support device for a structure, an inspection support method for a structure, and a program according to an embodiment of the present invention will be described with reference to the accompanying drawings. Here, the "structure" includes a construction, for example, a civil engineering structure such as a bridge, a tunnel, or a dam, and also includes an architectural structure such as a multistoried building, a house, or a wall, a column, and a beam of a building.

Hardware Configuration of Inspection Support Device for Structure

Figure 1:
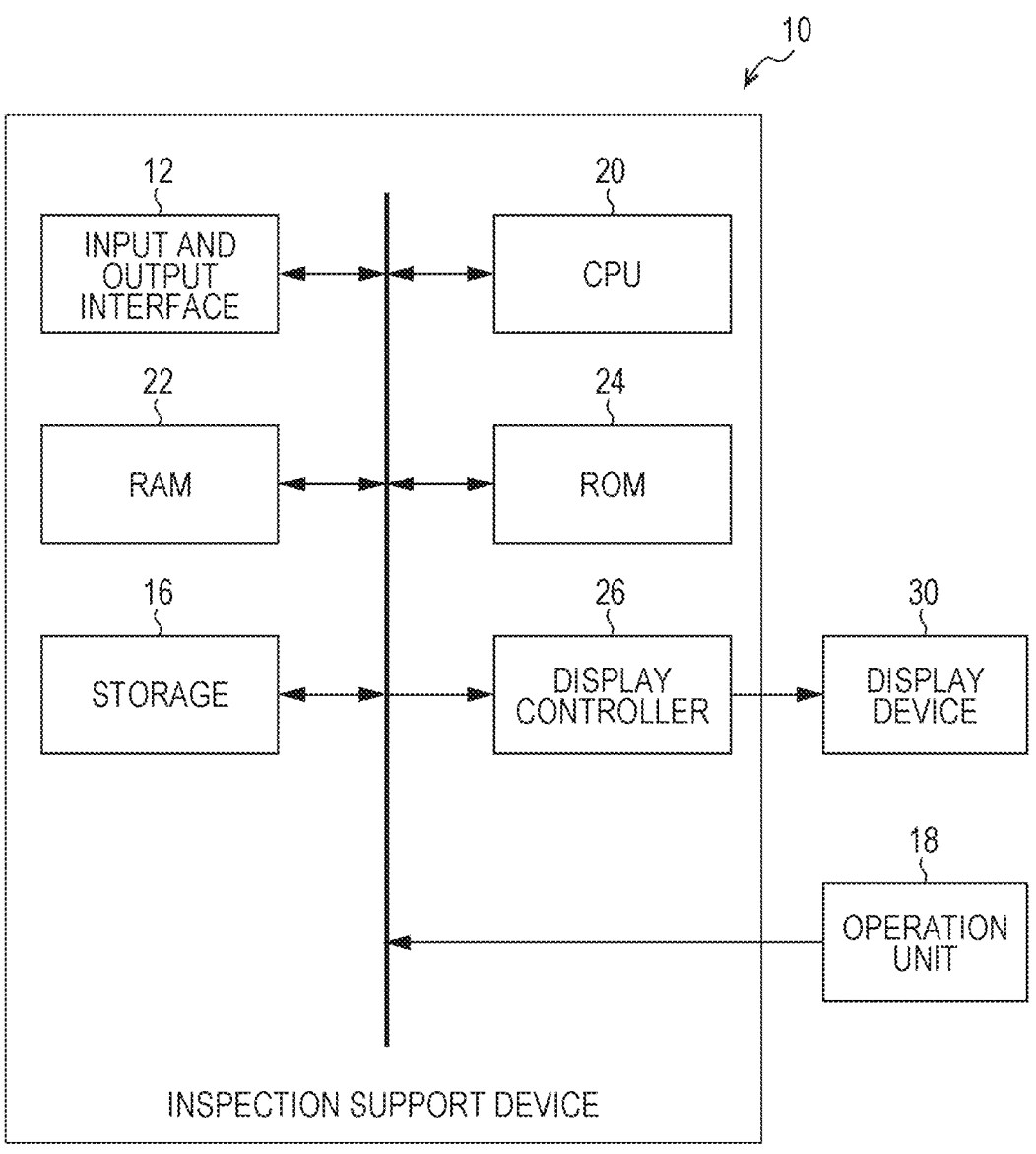
FIG. 1 is a block diagram showing an example of a hardware configuration of an inspection support device for a structure.

FIG. 1 is a block diagram showing an example of a hardware configuration of an inspection support device for a structure according to an embodiment of the present invention.

As an inspection support device 10 of a structure shown in FIG. 1, a computer or a workstation may be used. The inspection support device 10 for a structure of this example mainly includes an input and output interface 12, a storage 16, an operation unit 18, a central processing unit (CPU) 20, a random access memory (RAM) 22, a read only memory (ROM) 24, and a display controller 26. A display device 30 constituting a display is connected to an inspection support device 10 for a structure, and display is performed on the display device 30 by the control of the display controller 26 under the instruction of the CPU 20. The display device 30 includes, for example, a monitor.

The input and output interface 12 can input various data (information) to the inspection support device 10 for a structure. For example, data stored in the storage 16 is input via the input and output interface 12.

The CPU (processor) 20 reads various programs including an inspection support program for a structure according to the embodiment stored in the storage 16, the ROM 24, or the like, develops the programs in the RAM 22, and performs calculation to integrally control each unit. In addition, the CPU 20 reads a program stored in the storage 16 or the ROM 24, performs calculation using the RAM 22, and performs various processing of the inspection support device 10 for a structure.

FIG. 2 is a block diagram showing processing functions implemented by the CPU 20.

The CPU 20 includes an image data acquirer 51, a damage information recognizer 53, a drawing data acquirer 55, an aligner 57, and a damage diagram creator 59. A specific processing function of each unit will be described later. The image data acquirer 51, the damage information recognizer 53, the drawing data acquirer 55, the aligner 57, and the damage diagram creator 59 are a part of the CPU 20, and the CPU 20 executes processing of each unit.

Referring to FIG. 1 again, the storage (memory) 16 is a memory including a hard disk device, a flash memory, or the like. The storage 16 stores data and programs for operating the inspection support device 10 for a structure, such as an operating system and a program for executing the inspection support method for a structure. In addition, the storage 16 stores information and the like used in the present embodiment described below.

FIG. 3 is a diagram showing the information and the like stored in the storage 16. The storage 16 includes a non-transitory recording medium such as a compact disk (CD), a digital versatile disk (DVD), a hard disk, and various semiconductor memories, and a controller thereof.

The storage 16 mainly stores drawing data 101 of the target structure, a captured image 103 obtained by capturing a target structure, past damage information 105 of the target structure, and the like.

The drawing data 101 of the target structure is data (drawing and CAD data) including a shape, a dimension, and a member at the time of design of the target structure. The drawing data 101 is stored in association with drawing data identification information (for example, a file name) that can specify the drawing data 101.

The captured image 103 obtained by imaging the target structure is data of an image obtained by imaging the target structure in a current state at an inspection site. The captured image 103 is stored in association with captured image identification information (for example, a file name) that can specify the captured image 103.

The past damage information 105 is data including damage information created at the time of the previous inspection (for example, data in the form of a damage diagram). The past damage information 105 is associated with a past captured image captured at the time of the previous inspection. The past damage information 105 is stored in association with past damage identification information (for example, a file name). Here, the damage diagram may be in a form determined by the Ministry of Land, Infrastructure, Transport and Tourism, or a local government.

Referring to FIG. 1 again, the operation unit 18 includes a keyboard and a mouse, and a user can cause the inspection support device 10 to perform necessary processing with these devices. By using a touch panel device, the display device 30 also functions as an operation unit.

The display device 30 is, for example, a device such as a liquid crystal display, and can display various kinds of information.

Figure 4:
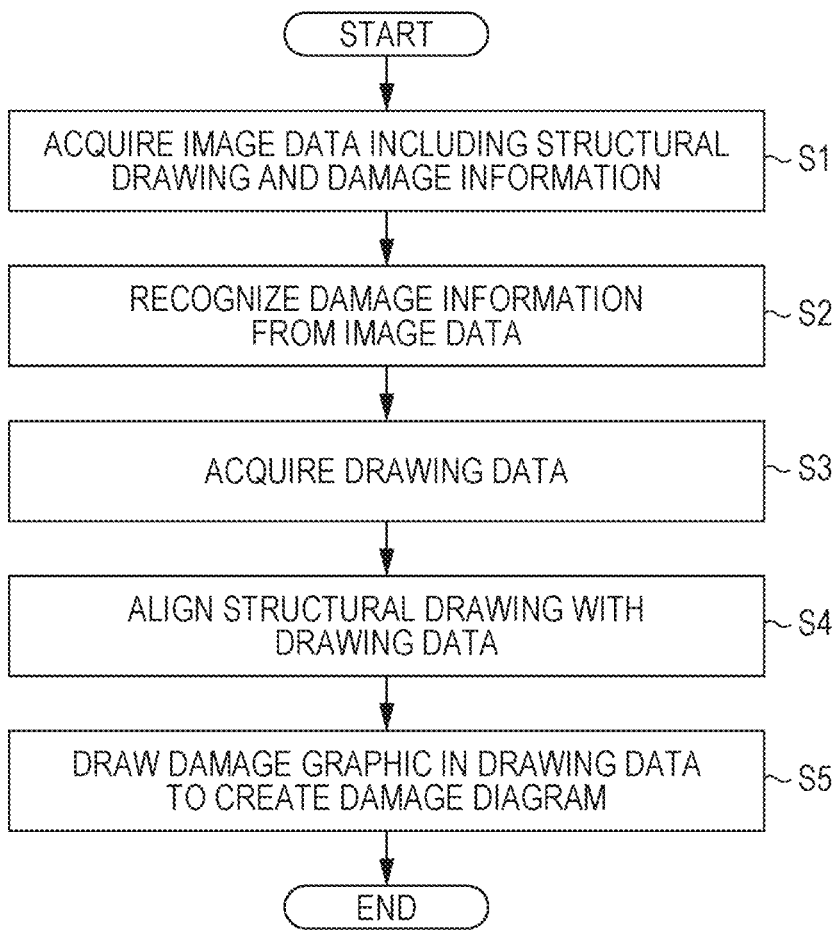
FIG. 4 is a flowchart of an inspection support method using an inspection support device according to an embodiment.

Next, a flow showing an inspection support method using the inspection support device 10 will be described. FIG. 4 is a flowchart showing the inspection support method using the inspection support device 10.

As shown in FIG. 4, the inspection support method includes a step (step S1) of acquiring image data including a structural drawing and damage information, a step (step S2) of recognizing the damage information from the image data, a step (step S3) of acquiring a drawing data, a step (step S4) of aligning the structural drawing and the drawing data, and a step (step S5) of drawing a damage graphic on the drawing data to create a damage diagram.

First, an inspection at an inspection site by the user will be described, and then the structural drawing as the basis of the image data and a medium including information including the damage information will be described.

Figure 5:
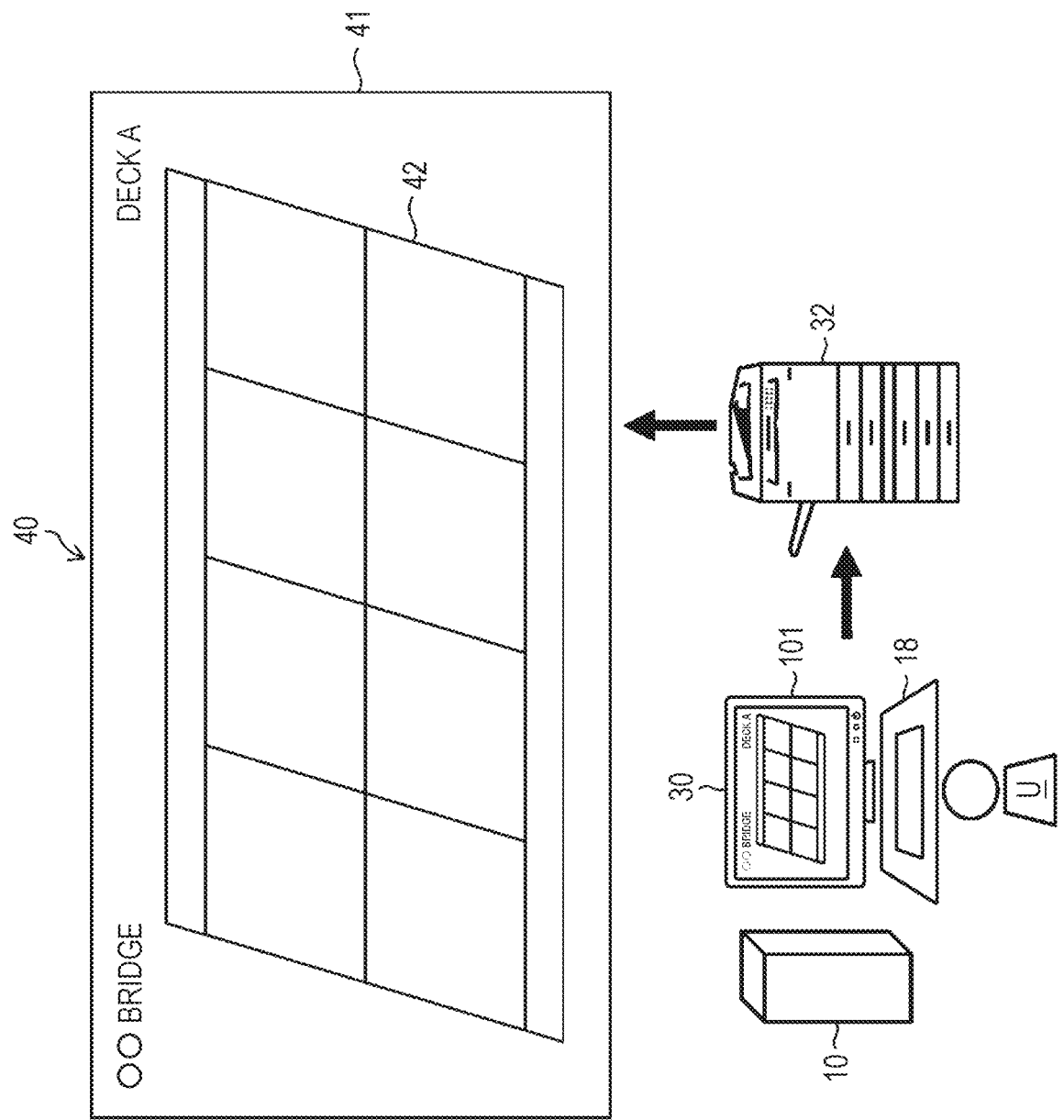
FIG. 5 is an explanatory diagram of processing of printing a structural drawing on a paper medium by using the inspection support device.

The user prepares a medium including a damage diagram to be inspected before performing inspection at the inspection site. As shown in FIG. 5, a user U inputs an operation command to the inspection support device 10 by operating the operation unit 18. Here, the user U inputs a condition for specifying the target structure from the operation unit 18, and extracts the drawing data 101 to be currently inspected from the storage 16 (see FIG. 3). The drawing data 101 to be inspected is displayed on the display device 30. The user U checks whether the displayed drawing data 101 corresponds to the target structure. In a case where the drawing data 101 corresponds to the target structure, the user U inputs an output instruction from the operation unit 18. A printing device 32 prints the drawing data 101 on a paper medium 41 as a structural drawing 42 of the target structure. Accordingly, a field notebook 40 in which the structural drawing 42 is printed on the paper medium 41 is created. A bridge name and a member name are described in the field notebook 40.

Figure 6:
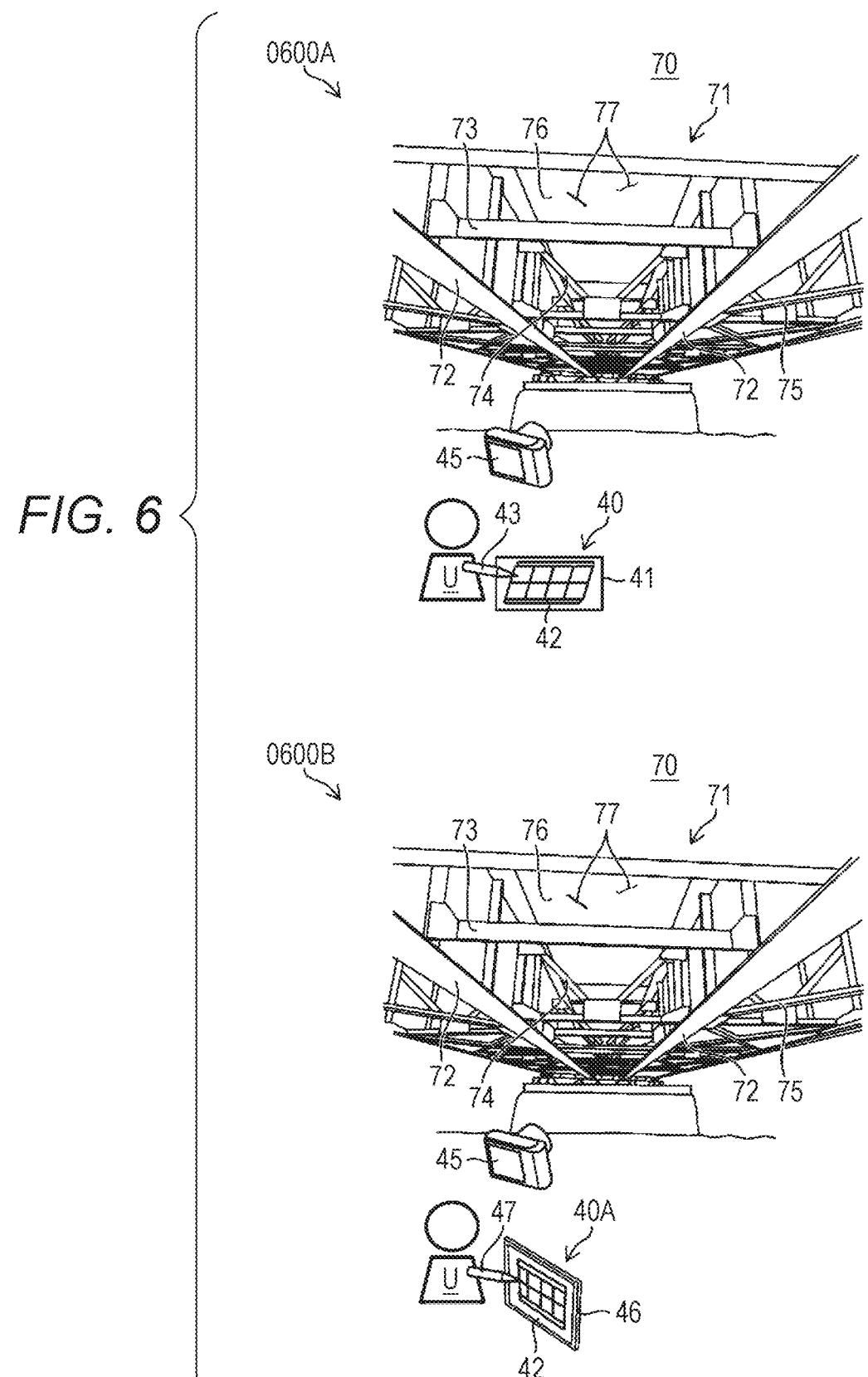
FIG. 6 is a diagram for describing work in which a user inspects a bridge at an inspection site.

FIG. 6 is a diagram for describing a case where the user U inspects a bridge at an inspection site. In a bridge that is an example of a structure 70 to which an embodiment of the present invention is applied, a bridge 71 includes a main girder 72, a cross girder 73, a cross frame 74, and a lateral frame 75. A deck 76 that is a concrete member is provided on an upper part of the main girder 72. The main girder 72 is a member that is laid between abutments or piers and supports a load on the deck 76. The cross girder 73 is a member that connects the plurality of main girders 72 to support a load by the main girders 72. The cross frame 74 and the lateral frame 75 are members that connect the main girders 72 to each other to resist a lateral load in particular.

As shown in 0600A, the user U confirms a state (appearance property) of the bridge which is the structure 70 to be inspected by visual appearance inspection at the inspection site while holding the field notebook 40 and a pen 43. The user U adds damage information 60 (see FIGS. 7 to 12) related to damage 77 of the structure 70 obtained by visual appearance inspection to the paper medium 41 of the field notebook 40 by handwriting with the pen 43. The structural drawing 42 is printed on the paper medium 41. The user U images the damage 77 with a digital camera 45 and acquires the captured image 103 (not shown) as objective data. The user U adds the captured image identification information (file name) corresponding to the captured image 103 to the paper medium 41 of the field notebook 40 by handwriting in order to indicate a positional relationship between the plurality of captured images 103 and the structure 70 (see FIGS. 7 to 12).

In 0600B, the user U confirms, by visual appearance inspection, the state of the bridge which is the structure 70 to be inspected while holding a field notebook 40A of an electronic medium 46 such as a tablet and an electronic pen 47 instead of the field notebook 40 and the pen 43 of the paper medium 41. The user U adds the damage information 60 related to the damage 77 of the structure 70 obtained by visual appearance inspection to the electronic medium 46 of the field notebook 40A by handwriting with the electronic pen 47. In addition, the user U images the damage 77 with the digital camera 45 and acquires the captured image 103 (not shown) as objective data. The user U adds the captured image identification information (file name) corresponding to the captured image 103 to the electronic medium 46 of the field notebook 40A by handwriting in order to indicate the positional relationship between the plurality of captured images 103 and the structure 70.

Figure 7:
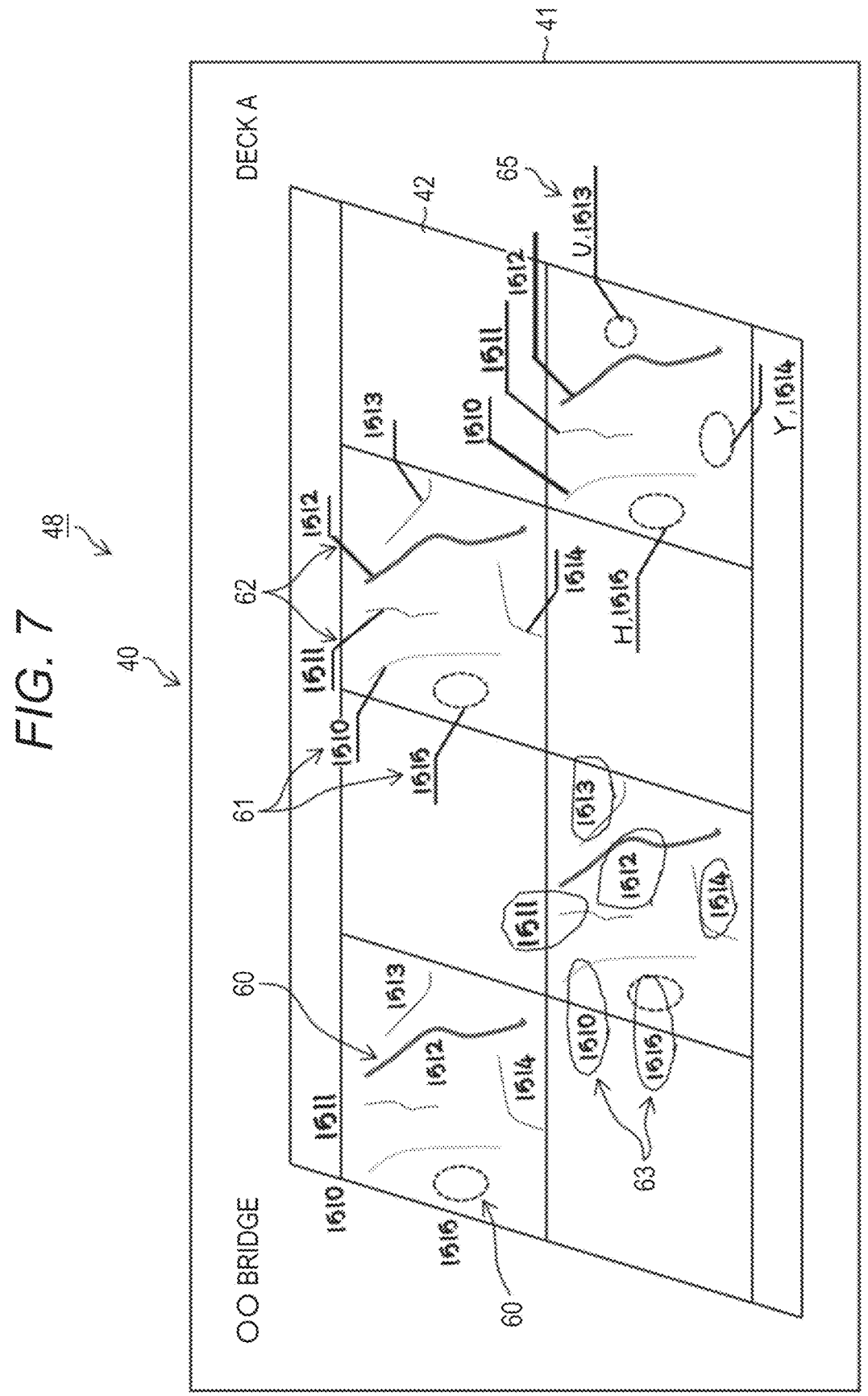
FIG. 7 is a diagram showing an example of a description example of an inspection memo.

FIG. 7 shows an example of the paper medium 41 (field notebook 40) on which the structural drawing 42 of a deck A is printed and to which information including the damage information 60 is added by handwriting, that is, a so-called inspection memo 48. FIG. 7 includes a plurality of description formats.

As shown in FIG. 7, the damage information 60 is added by the user on the paper medium 41 on which the structural drawing 42 of the deck A is printed. On the paper medium 41 of the field notebook 40, captured image identification information 61 in a case where the damage 77 is imaged is added together with the damage information 60 as necessary. Further, association information 62 and 63 indicating relevance between the captured image identification information 61 and the damage information 60, auxiliary information 64 (see FIG. 9), additional attribute information 65, and the like are included. The handwritten damage information 60 and the captured image identification information 61 are added to the field notebook 40, and the inspection memo 48 is created.

FIGS. 8 to 12 are diagrams showing individual description examples of the inspection memo.

Figure 8:
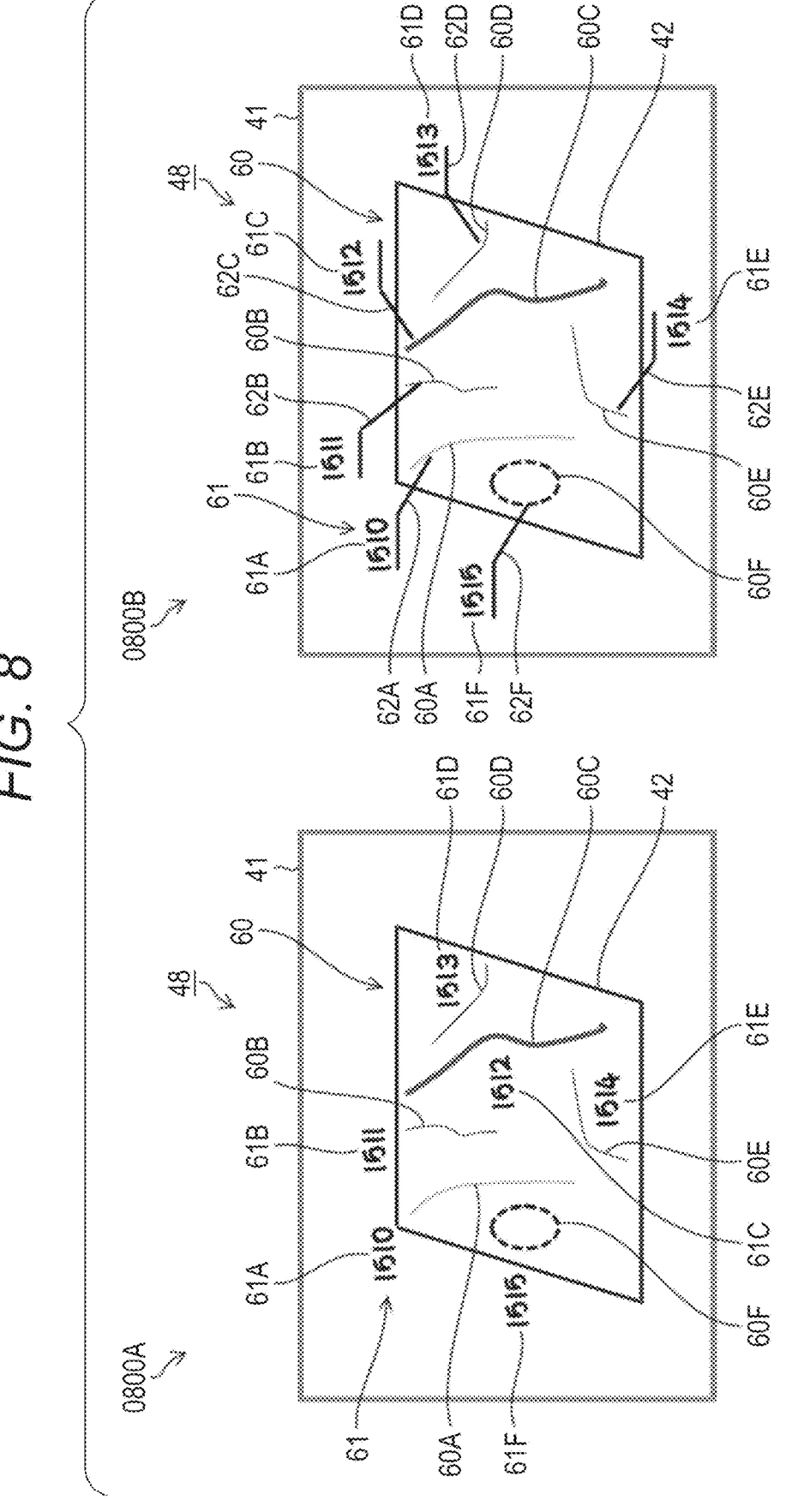
FIG. 8 is a diagram showing a description example of the inspection memo.

0800A in FIG. 8 is a first example, and 0800B is a second example.

The first example of 0800A is shown in the inspection memo 48 including the damage information 60 and the captured image identification information 61 added by the user in relation to the damage 77 (see FIG. 6) of the structure 70. The damage information 60 shows damage such as a crack, water leakage, and free lime by a line drawing, a line type, a region, and the like. The damage information 60 includes damage information 60A, 60B, 60C, 60D, 60E, and 60F. The damage information 60A, 60B, 60C, 60D, and 60E show a state of the damage 77 related to cracks by a line drawing. The damage information 60A is drawn by an orange line, and indicates a crack having a width of 0.2 mm or more and less than 0.3 mm. The damage information 60B, 60D, and 60E are drawn by blue lines, and indicate cracks having a width of less than 0.2 mm. The damage information 60C is drawn by a red line, and indicates a crack having a width of 0.3 mm or more. The damage information 60F indicates the regional damage 77 by a closed curve in a black dotted line. The regional damage includes, for example, peeling, reinforcement exposure, free lime, water leakage, floating, and others not belonging to these.

The captured image identification information 61 is a file name or a part of a file name (hereinafter, referred to as a "file name") of the captured image 103 obtained by imaging the damage 77, and includes, for example, a number, a character, a symbol, or characters that are a combination thereof. The captured image identification information 61 includes captured image identification information 61A, 61B, 61C, 61D, 61E, and 61F. For example, the captured image identification information 61A includes a character string "1510" and indicates a part of a file name "DSCF1510.jpg". Similarly, the captured image identification information 61B, 61C, 61D, 61E, and 61F include "1511", "1512", "1513", "1514", and "1515", respectively. As long as the captured image identification information 61A, 61B, 61C, 61D, 61E, and 61F can be identified, the lengths and the like of the file names included in the captured image identification information 61 can be freely determined. In a case where the captured image identification information 61 includes the file name, the captured image 103 is extracted from the storage 16 based on the captured image identification information 61.

The captured image identification information 61 may include an imaging order instead of a file name. The captured image identification information 61A and 61B may include, for example, "1001" and "1002", respectively. The imaging order preferably includes a number, a character, or characters that are a combination thereof, and is preferably configured in accordance with some rule such that the order can be specified. Further, the imaging order "1001" is associated with the file name "1510". Therefore, the file name is specified from the imaging order included in the captured image identification information 61, and the captured image 103 is extracted from the storage 16 based on the file name.

The second example of 0800B includes the damage information 60 and the captured image identification information 61 similarly to the first example of 0800A. The second example of 0800B further includes the association information 62 that associates the damage information 60 with the captured image identification information 61.

The association information 62 is a line drawing connecting the corresponding damage information 60 and the captured image identification information 61. The association information 62 includes association information 62A, association information 62B, association information 62C, association information 62D, association information 62E, and association information 62F. For example, the association information 62A associates the damage information 60A with the captured image identification information 61A. The association information 62A includes a straight line positioned below the captured image identification information 61A and a straight line extending obliquely downward from a right end of the straight line and reaching the damage information 60A. Similarly, the association information 62B associates the damage information 60B with the captured image identification information 61B, the association information 62C associates the damage information 60C with the captured image identification information 61C, the association information 62D associates the damage information 60D with the captured image identification information 61D, the association information 62E associates the damage information 60E with the captured image identification information 61E, and the association information 62F associates the damage information 60F with the captured image identification information 61F. The shape and the type of the line of the association information 62 are not limited as long as the association information 62 can associate the damage information 60 with the captured image identification information 61.

Figure 9:
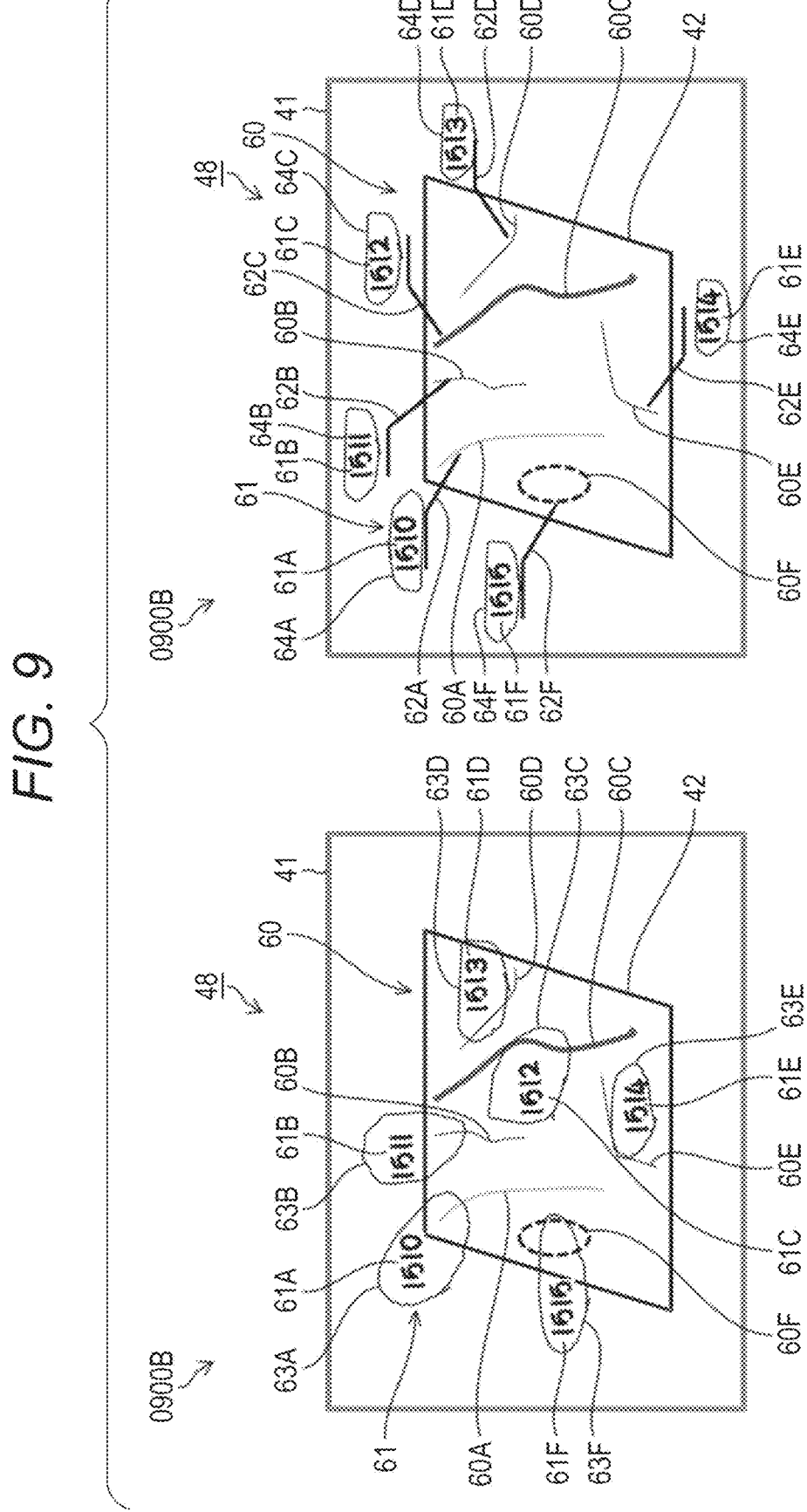
FIG. 9 is a diagram showing a description example of the inspection memo.

0900A in FIG. 9 is a third example, and 0900B is a fourth example.

The third example of 0900A includes the damage information 60 and the captured image identification information 61 similarly to the second example of 0800B. The association information 63 different from the association information 62 of the second example of 0800B is included. The association information 63 of the third example is a closed line drawing and surrounds the corresponding damage information 60 and the captured image identification information 61. The association information 63 does not need to entirely surround the damage information 60 and the captured image identification information 61, and may include the damage information 60 and the captured image identification information 61 corresponding to the association information 63.

The association information 63A associates the damage information 60A with the captured image identification information 61A. Similarly, the association information 63B associates the damage information 60B with the captured image identification information 61B, the association information 63C associates the damage information 60C with the captured image identification information 61C, the association information 63D associates the damage information 60D with the captured image identification information 61D, the association information 63E associates the damage information 60E with the captured image identification information 61E, and the association information 63F associates the damage information 60F with the captured image identification information 61F. The shape and the type of the line of the association information 63 are not limited as long as the association information 63 can associate the damage information 60 with the captured image identification information 61.

The fourth example of 0900B includes the damage information 60, the captured image identification information 61, and the association information 62 similarly to the second example of 0800B. The fourth example of 0900B further includes the auxiliary information 64 for specifying the position of the captured image identification information 61. The auxiliary information 64 surrounds the captured image identification information 61 with a predetermined line. The auxiliary information 64A surrounds the captured image identification information 61A. Similarly, the auxiliary information 64B surrounds the captured image identification information 61B, the auxiliary information 64C surrounds the captured image identification information 61C, the auxiliary information 64D surrounds the captured image identification information 61D, the auxiliary information 64E surrounds the captured image identification information 61E, and the auxiliary information 64F surrounds the captured image identification information 61F. The shape and the type of the line of the auxiliary information 64 are not limited as long as the auxiliary information 64 can surround the captured image identification information 61.

Figure 10:
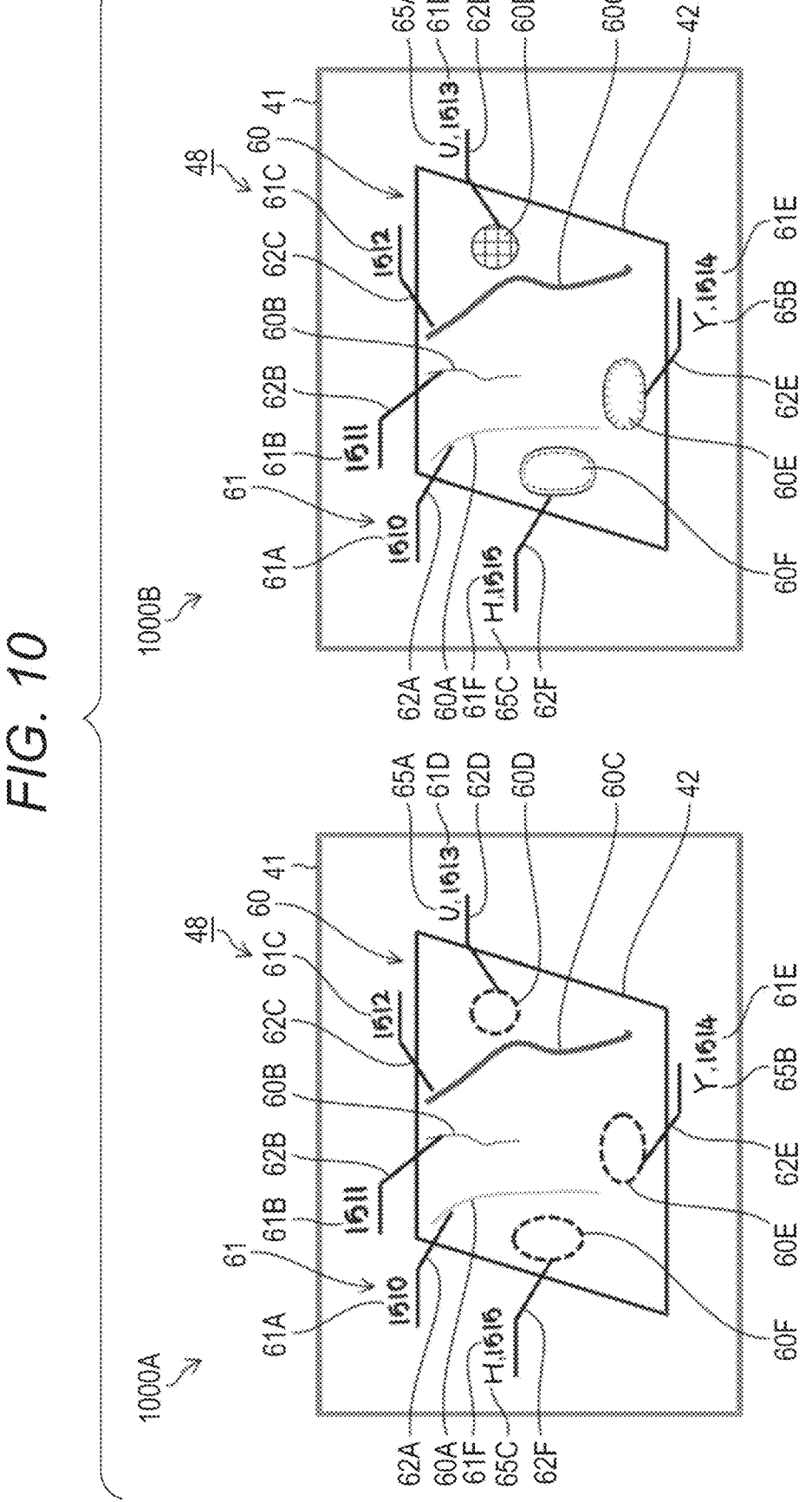
FIG. 10 is a diagram showing a description example of the inspection memo.

In FIG. 10, 1000A is a fifth example, and 1000B is a sixth example.

The fifth example of 1000A includes the damage information 60, the captured image identification information 61, and the association information 62.

The damage information 60 includes the damage information 60A, 60B, 60C, 60D, 60E, and 60F. The damage information 60A, 60B, and 60C indicate the state of the damage 77 related to cracks, and the damage information 60D, 60E, and 60F indicate the state of the regional damage 77. The damage information 60A is drawn by an orange line, the damage information 60B is drawn by a blue line, and the damage information 60C is drawn by a red line. The captured image identification information 61 includes captured image identification information 61A, 61B, 61C, 61D, 61E, and 61F. The association information 62 includes the association information 62A, the association information 62B, the association information 62C, the association information 62D, the association information 62E, and the association information 62F.

The fifth example of 1000A further includes the additional attribute information 65. The additional attribute information 65 includes characters including a number and a symbol indicating a type of regional damage. As an example of the character of the type of damage, "H" represents peeling, "Y" represents free lime, "R" represents water leakage, and "U" represents floating. The additional attribute information 65A includes "U", the additional attribute information 65B includes "Y", and the additional attribute information 65C includes "H". The additional attribute information 65A is associated with the damage information 60D by the association information 62D together with the captured image identification information 61D. Similarly, the additional attribute information 65B is associated with the damage information 60E by the association information 62E together with the captured image identification information 61E, and the additional attribute information 65C is associated with the damage information 60F by the association information 62F together with the captured image identification information 61F.

The sixth example of 1000B includes the damage information 60, the captured image identification information 61, and the association information 62 similarly to the fifth example of 1000A. In the sixth example of 1000B, in addition to the additional attribute information 65 of the fifth example of 1000A, information equivalent to the additional attribute information 65 is included as a sketch pattern indicating the type of regional damage in the damage information 60D, 60E, and 60F.

FIG. 11 is an explanatory diagram of sketch patterns indicating the types of regional damage included in the damage information 60. As shown in FIG. 11, the damage type and the pattern are associated with each other. The damage types include six types of "peeling", "reinforcement exposure", "free lime", "water leakage", "others", and "floating", and each of the six types of the damage types corresponds to different patterns.

In the sixth example of 1000B in FIG. 10, the damage information 60D, 60E, and 60F indicating the state of regional damage include a pattern (see FIG. 11). The damage information 60D includes a pattern corresponding to "floating", the damage information 60E includes a pattern corresponding to "free lime", and the damage information 60F includes a pattern corresponding to "peeling".

In the fifth example of 1000A, the additional attribute information 65 including characters is indicated, and in the sixth example of 1000B, an example is indicated in which the additional attribute information 65 and the pattern of the damage information 60 are included for one regional damage. The present invention is not limited to this, and the sixth example of 1000B in FIG. 10 may not include the additional attribute information 65.

Figure 12:
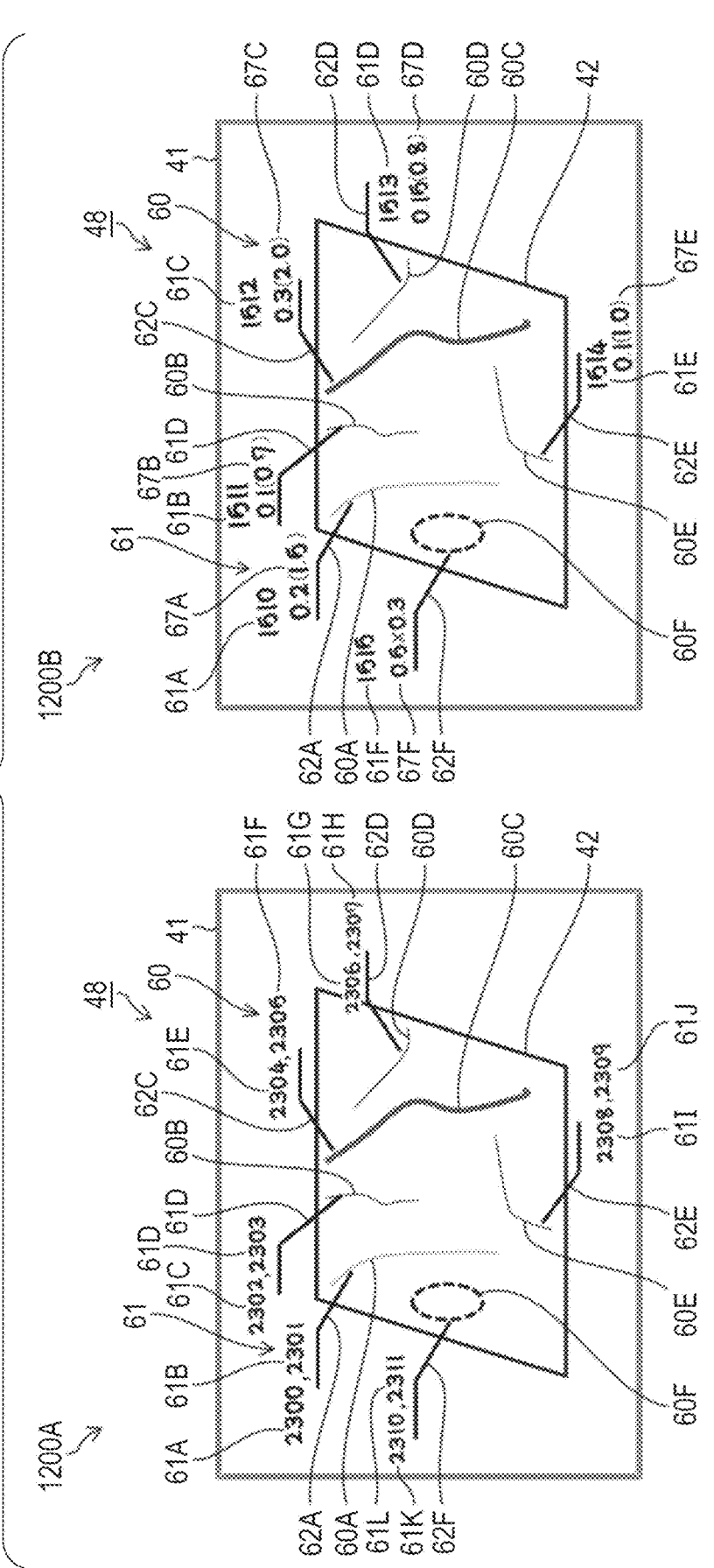
FIG. 12 is a diagram showing a description example of the inspection memo.

In FIG. 12, 1200A is a seventh example, and 1200B is an eighth example.

The seventh example of 1200A includes the damage information 60 and the association information 62 similarly to the second example of 0800B. The damage information 60A, 60B, 60C, 60D, and 60E indicate the state of the damage 77 related to cracks, and the damage information 60F indicates the state of the regional damage 77.

Unlike the second example of 0800B, in the seventh example of 1200A, two captured image identification information 61 correspond to one damage information 60. The two captured image identification information 61 correspond to different captured images 103. For example, one captured image 103 is a close-up image in which the state of the damage 77 is recognizable, and the other captured image 103 is a distant view image in which the position of the damage 77 is recognizable.

As indicated by 1200A, the damage information 60A is associated with the captured image identification information 61A and 61B by association information 62A. Similarly, the damage information 60B is associated with the captured image identification information 61C and 61D by the association information 62B. The damage information 60C is associated with the captured image identification information 61E and the captured image identification information 61F by the association information 62C. The damage information 60D is associated with captured image identification information 61G and 61H by the association information 62D. The damage information 60E is associated with captured image identification information 61I and 61J by the association information 62E. The damage information 60F is associated with captured image identification information 61K and 61L by the association information 62F.

The eighth example of 1200B includes the damage information 60, the captured image identification information 61, and the association information 62, similarly to the second example of 0800B. The damage information 60A, 60B, 60C, 60D, and 60E indicate the state of the damage 77 related to cracks, and the damage information 60F indicates the state of the regional damage 77. The captured image identification information 61 includes captured image identification information 61A, 61B, 61C, 61D, 61E, and 61F.

The eighth example of 1200B further includes additional attribute information 67. The additional attribute information 67 includes a number indicating the size of the damage 77. The damage information 60A is associated with the captured image identification information 61A and additional attribute information 67A by the association information 62A. The additional attribute information 67A includes a number "0.2 (1.5)" for a size corresponding to the damage information 60A. Here, the number means a width of 0.2 mm and a length of 1.5 m. As for the damage of cracks, the first number indicates the width (mm), and the number in parentheses indicates the length (m). Therefore, the numbers of the additional attribute information 67B to 67E indicate a width (mm) and a length (m). mm represents millimeter, and m represents meter.

The additional attribute information 67B includes a number "0.1 (0.7)" for a size corresponding to the damage information 60B. The additional attribute information 67C includes a number "0.3 (2.0)" for a size corresponding to the damage information 60C. The additional attribute information 67D includes a number "0.15 (0.8)" for a size corresponding to the damage information 60D. The additional attribute information 67E includes a number "0.15 (0.8)" for a size corresponding to the damage information 60E.

The additional attribute information 67F includes a number "0.5×0.3" for a size corresponding to the damage information 60F. Here, the number means 0.5 m of the long side×0.3 m of the short side. As for the regional damage, the first number indicates the long side (m), and the next number indicates the short side (m).

The first to eighth examples of the inspection memo 48 have been exemplified in FIGS. 8 to 12, but the present invention is not limited thereto.

Referring to FIG. 4 again, in step S1, the structural drawing 42 of the target structure on the medium and image data 80 (see FIG. 13) of information including the damage information 60 added on the medium by the user are acquired. The image data acquirer 51 of the CPU 20 acquires the image data 80 of information including the structural drawing 42 of the target structure on the medium and the damage information 60 added on the medium by the user (step S1).

Figure 13:
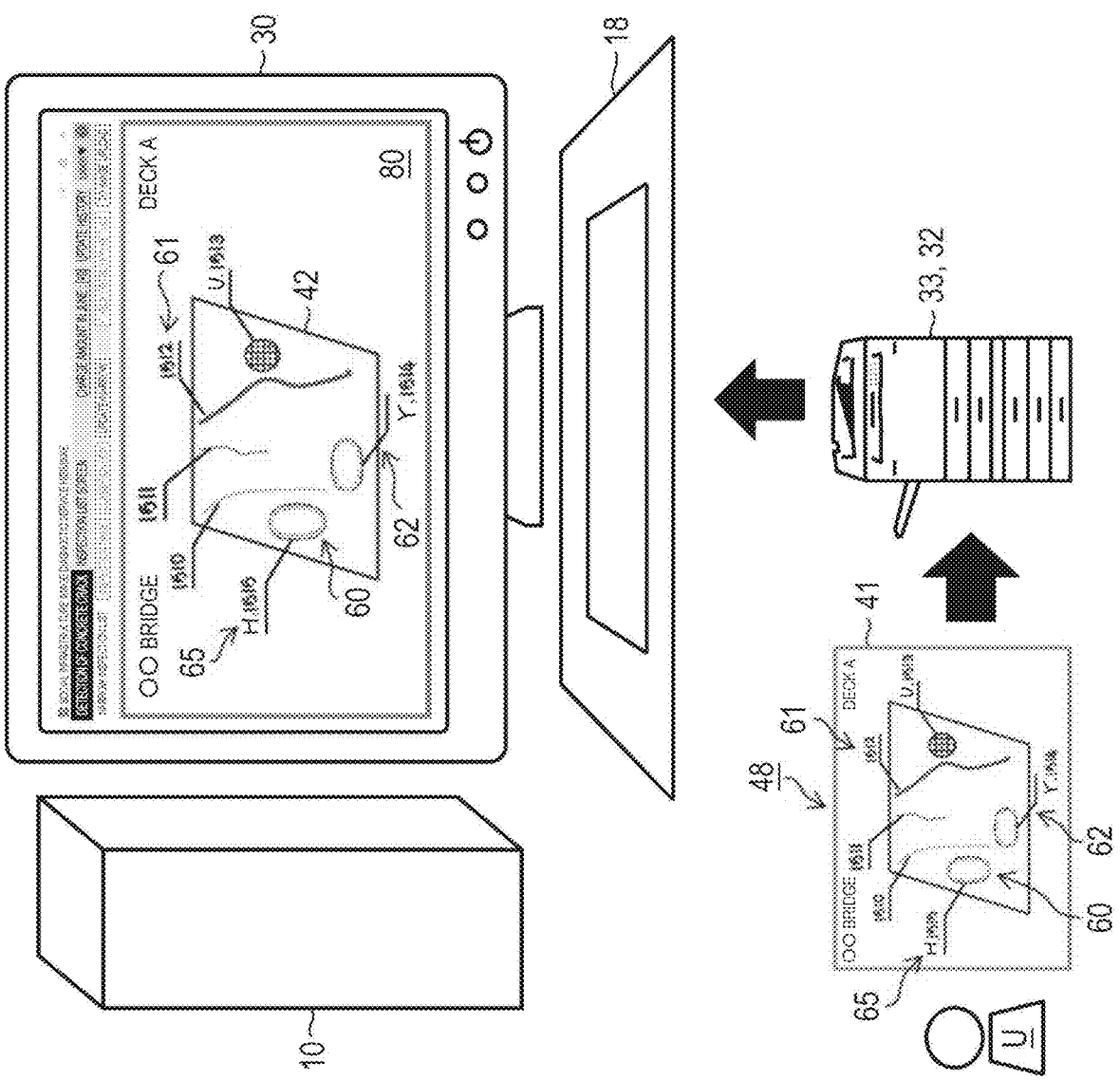
FIG. 13 is a diagram describing processing of acquiring the image data of the inspection memo.

In step S1, as shown in FIG. 13, for example, the inspection memo 48 of the paper medium 41 of the sixth example indicated by 1000B is read by a scanning device 33, and the read image data 80 is acquired by the inspection support device 10 from the image data acquirer 51. The printing device 32 and the scanning device 33 can be configured as a single device having both functions.

The inspection memo 48 includes the structural drawing 42, the damage information 60 added by the user U, the captured image identification information 61, the association information 62, and the additional attribute information 65. The acquired image data 80 of the inspection memo 48 is displayed on, for example, the display device 30. In the case of the field notebook 40A of the electronic medium 46, the image data acquirer 51 acquires the field notebook 40A from the electronic medium 46 as the image data 80.

Next, in step S2, the damage information is recognized from the acquired image data 80 by image recognition. The damage information recognizer 53 of the CPU 20 recognizes the damage information 60 by image recognition from the acquired image data 80 (step S2).

In step S2, as for the damage information 60 added by the user U, regions of a line drawing and a sketch line representing a position, a shape, or an attribute (a damage type, a size, a damage degree, and the like) of the damage in the damage information 60 are recognized by image recognition.

The damage information recognizer 53 recognizes a difference in attribute of the damage information 60 from different colors, line types, and patterns drawn from the image data 80 in accordance with the attribute of the damage information 60. The damage information recognizer 53 can distinguish a difference in attribute based on a difference in color or line type. The color, the line type, and the pattern applied to the damage information 60 are determined in advance by the user U.

The attribute in the damage information 60 includes the damage type, the size, the damage degree, and the like. (1) The damage type classifies types of linear damage, regional damage, and the like. The linear damage includes a crack, a fissure, and the like. The regional damage includes water leakage, free lime, peeling, reinforcement exposure, dripping rust, corrosion, deterioration of an anticorrosion function, and the like. (2) The size is, for example, the width of a crack. The widths of the cracks can be classified into, for example, less than 0.2 mm, 0.2 mm or more, less than 0.3 mm, 0.3 mm or more, and the like. (3) The damage degree includes, for example, ranks a, b, c, d, and e of the degree of progress of damage, which are classifications according to the standard of an inspection procedure defined by a manager or the like of the structure. The attribute of the damage information 60 is useful for confirming the state and diagnosing the soundness in a periodic inspection, and becomes basic data related to the state of damage. The attribute can be used for repairing the structure, for example. In addition, the attribute can be used to recognize the state of progress of damage at the time of the next periodic inspection.

It is preferable that the damage information recognizer 53 recognizes the damage information 60 from the image data 80 by image recognition by at least one of a machine learning model or an image recognition algorithm. The recognition accuracy of the damage information 60 can be improved. The machine learning model is a machine learning model trained by a well-known technique. For example, training data related to the damage information 60 can be prepared, and a machine learning model that is machine-trained by using the training data can be applied. A well-known algorithm can be applied to the image recognition algorithm.

In the embodiment, the damage information recognizer 53 recognizes that the damage information 60A, 60B, and 60C indicate the state of damage related to cracks from the image data 80, and recognizes that the damage information of 60D, 60E, and 60F indicate the state of regional damage (see 1000B in FIG. 10 for each of the reference numbers of the damage information 60A, 60B, 60C, 60D, 60E, and 60F). The damage information recognizer 53 recognizes the line type of the damage information 60D, 60E, and 60F, that the damage information 60A is drawn by an orange line, the damage information 60B is drawn by a blue line, and the damage information 60C is drawn by a red line. The damage information recognizer 53 recognizes the classification of the width of the damage from the colors of the line types of the damage information 60A, the 60B, and 60C. The width of the damage can be classified into less than 0.2 mm, 0.2 mm or more and less than 0.3 mm, 0.3 mm or more, and the like. For example, the relationship between the color of the line type and the width of the damage is stored in the storage 16 as attribute reference information, and the damage information recognizer 53 recognizes the width of the damage from the attribute reference information.

In addition, from the patterns included in the damage information 60D, 60E, and 60F, it is recognized that the damage type of the damage information 60D is "floating", the damage type of the damage information 60E is "free lime", and the damage type of the damage information 60F is "peeling". The information indicating the relationship between the damage type and the pattern shown in FIG. 11 is stored in the storage 16 as attribute reference information, and the damage information recognizer 53 recognizes the attribute of the damage based on the reference information.

The damage information recognizer 53 recognizes the position of the damage information 60 on the image data 80. The damage information recognizer 53 recognizes, for example, a relative position of the damage information 60 with respect to the structural drawing 42 included in the image data 80. The position of the damage information 60 can be specified with reference to the structural drawing 42.

The damage information recognizer 53 recognizes the additional attribute information 65 associated with the damage information 60 included in the image data 80 by character recognition. Attribute information of damage not included in the damage information 60 is additionally recognized by a character string of the additional attribute information 65. Further, a more detailed attribute of the attribute recognized from the damage information 60 is additionally recognized by the character string of the additional attribute information 65.

For example, in the sixth example (1000B in FIG. 10), the damage information recognizer 53 recognizes the character "U" of the additional attribute information 65A corresponding to the damage information 60D, recognizes the character "Y" of the additional attribute information 65B corresponding to the damage information 60E, and recognizes the character "H" of the additional attribute information 65C corresponding to the damage information 60F.

The damage information recognizer 53 recognizes any regional damage (water leakage, free lime, peeling, floating, or the like) (broad classification of damage types) by recognizing the damage information 60, and recognizes a specific damage type (water leakage, free lime, peeling, floating, or the like) from the character string of the associated additional attribute information 65. Accordingly, the attribute of the damage information 60 can be recognized with higher accuracy.

In addition, in a case where the inspection memo 48 is the eighth example (1200B in FIG. 12), the damage information recognizer 53 recognizes the additional attribute information 67 associated with the damage information 60 included in the image data 80 by character recognition. The damage information recognizer 53 recognizes the number "0.2 (1.5)" for the size as characters from the additional attribute information 67A associated with the damage information 60A. Similarly, the damage information recognizer 53 recognizes the number "0.1 (0.7)" for the size as characters from the additional attribute information 67B, recognizes the number "0.3 (2.0)" for the size as characters from the additional attribute information 67C, recognizes the number "0.15 (0.8)" for the size as characters from the additional attribute information 67D, and recognizes the number "0.15 (0.8)" for the size as characters from the additional attribute information 67E. As described above, it is determined in advance that the first number for the damage of a crack indicates the width (mm) and the number in parentheses indicates the length (m).

As a result, the damage information recognizer 53 recognizes the classification of the width of the crack (less than 0.2 mm, 0.2 mm or more and less than 0.3 mm, 0.3 mm or more, and the like) from the color of the damage information 60, and recognizes the detailed width and length of the crack from the characters (number) of the additional attribute information 67.

The damage information recognizer 53 associates the damage information 60 included in the image data 80 with the additional attribute information 65 based on a predetermined condition. In a case where the inspection memo 48 is the sixth example (1000B in FIG. 10), the damage information recognizer 53 associates the damage information 60 with the additional attribute information 65 based on the association information 62 of the image data 80. The association information 62 is a line drawing connecting the damage information 60 and the additional attribute information 65, and the damage information recognizer 53 detects the association information 62 and associates the characters specifying the corresponding additional attribute information 65 with the damage information 60. The association information 62 is not limited to a line drawing, and the inspection memo 48 may be the association information 63 (closed line drawing) as shown in the third example (0900A in FIG. 9).

In a case where the image data 80 does not include the association information 62 and 63, the damage information recognizer 53 associates the additional attribute information 65 closest to the damage information 60 as the additional attribute information 65 corresponding to the damage information 60. The user can determine a condition for associating the damage information 60 with the additional attribute information 65 in advance, and can cause the damage information recognizer 53 to perform processing based on the condition.

The damage information recognizer 53 detects the auxiliary information 64 included in the image data 80, and recognizes the characters of the additional attribute information 65 based on the auxiliary information 64. For example, the auxiliary information 64 of the fourth example indicated in 0900B by the inspection memo 48 can be added to, for example, the sixth example. By surrounding the additional attribute information 65 with the auxiliary information 64, the damage information recognizer 53 specifies the position of the additional attribute information 65 based on the auxiliary information 64. By specifying the position of the additional attribute information 65, the accuracy with which the damage information recognizer 53 recognizes the characters of the additional attribute information 65 can be improved.

In a case where the image data 80 does not include the auxiliary information 64, for example, as shown in FIG. 13, in a case where the image data 80 is displayed on the display device 30, assist information equivalent to the auxiliary information 64 such as surrounding the additional attribute information 65 may be input on the image data 80, and the characters of the additional attribute information 65 may be recognized based on the assist information.

In a case where the image data 80 includes the captured image identification information 61 of the captured image 103 obtained by capturing the target structure, it is preferable to acquire the captured image 103 from the captured image identification information 61 and acquire complementary information that complements the damage information 60 from the captured image 103.

By acquiring not only the damage information 60 and the additional attribute information 65 (67) but also the complementary information from the captured image 103, the state of the damage 77 can be recognized more accurately.

Figure 14:
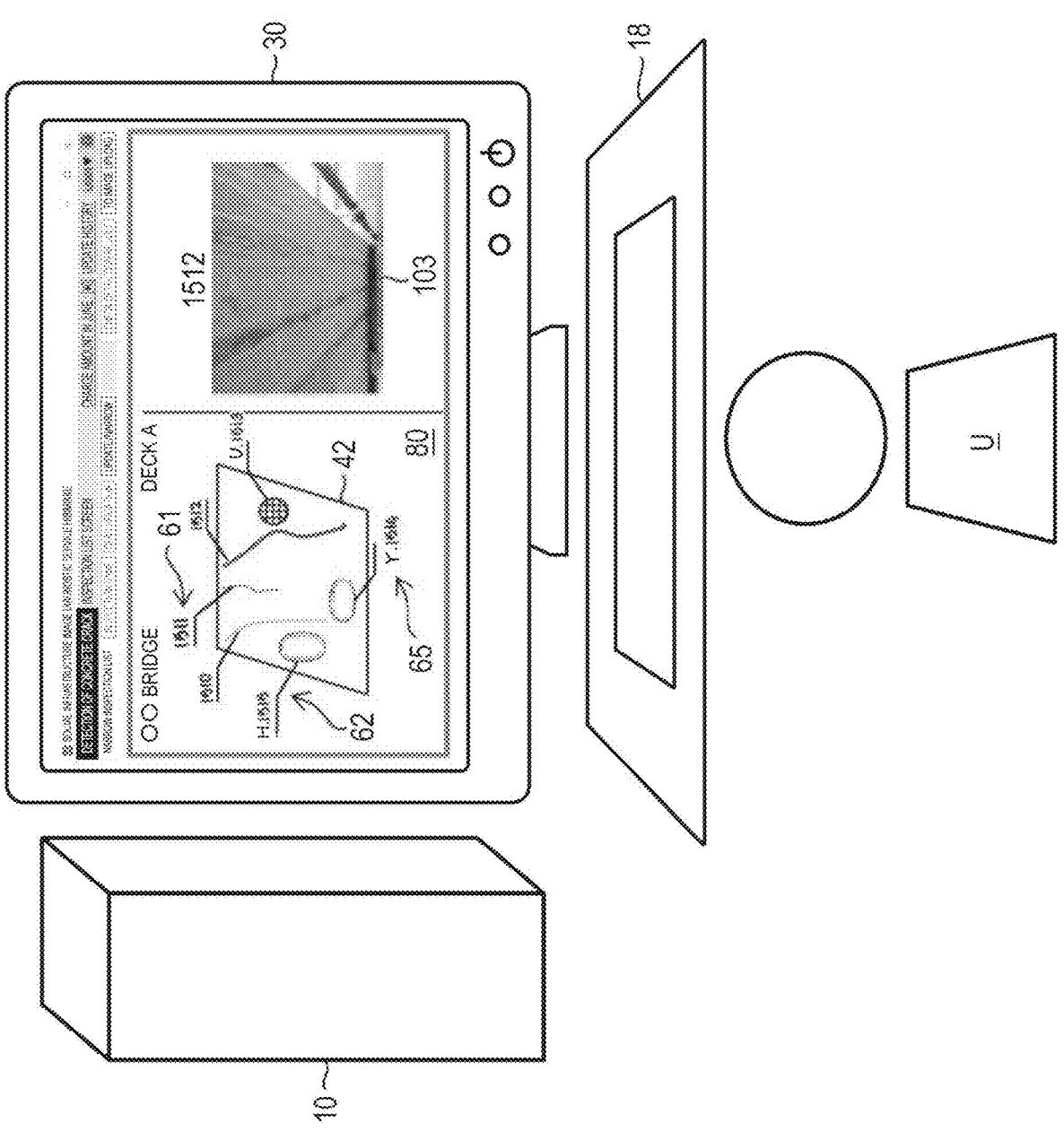
FIG. 14 is a diagram describing processing of acquiring complementary information from a captured image.

For example, as shown in FIG. 14, a state where the captured image 103 is acquired from the storage 16 based on the captured image identification information 61 included in the image data 80 is shown. The captured image 103 corresponding to the file name "1512" included in the captured image identification information 61 of the image data 80 is displayed on the display device 30.

The damage information recognizer 53 recognizes the shape and/or the attribute (type, size, degree, and the like) of the damage 77 from the captured image 103 by image recognition (machine learning model or image analysis).

In a case where the size is also recognized based on the captured image 103, the size of the damage 77 can be recognized by inputting resolution information (mm/pixel) of the captured image 103 or an actual size of a predetermined region or an object in the image data 80. The attribute of the property of an outer shape obtained from the captured image 103 complements the damage information 60 or the additional attribute information 65, and the attribute of the size obtained from the captured image 103 complements the additional attribute information 67.

Next, in step S3, the drawing data 101 corresponding to the structural drawing 42 is acquired. The drawing data acquirer 55 of the CPU 20 acquires the drawing data 101 (step S3).

For example, in a case where the bridge name and the member name are included in the image data 80, the drawing data acquirer 55 extracts and acquires the drawing data 101 corresponding to the structural drawing 42 of the image data 80 from the storage 16 from the bridge name and the member name.

Figure 15:
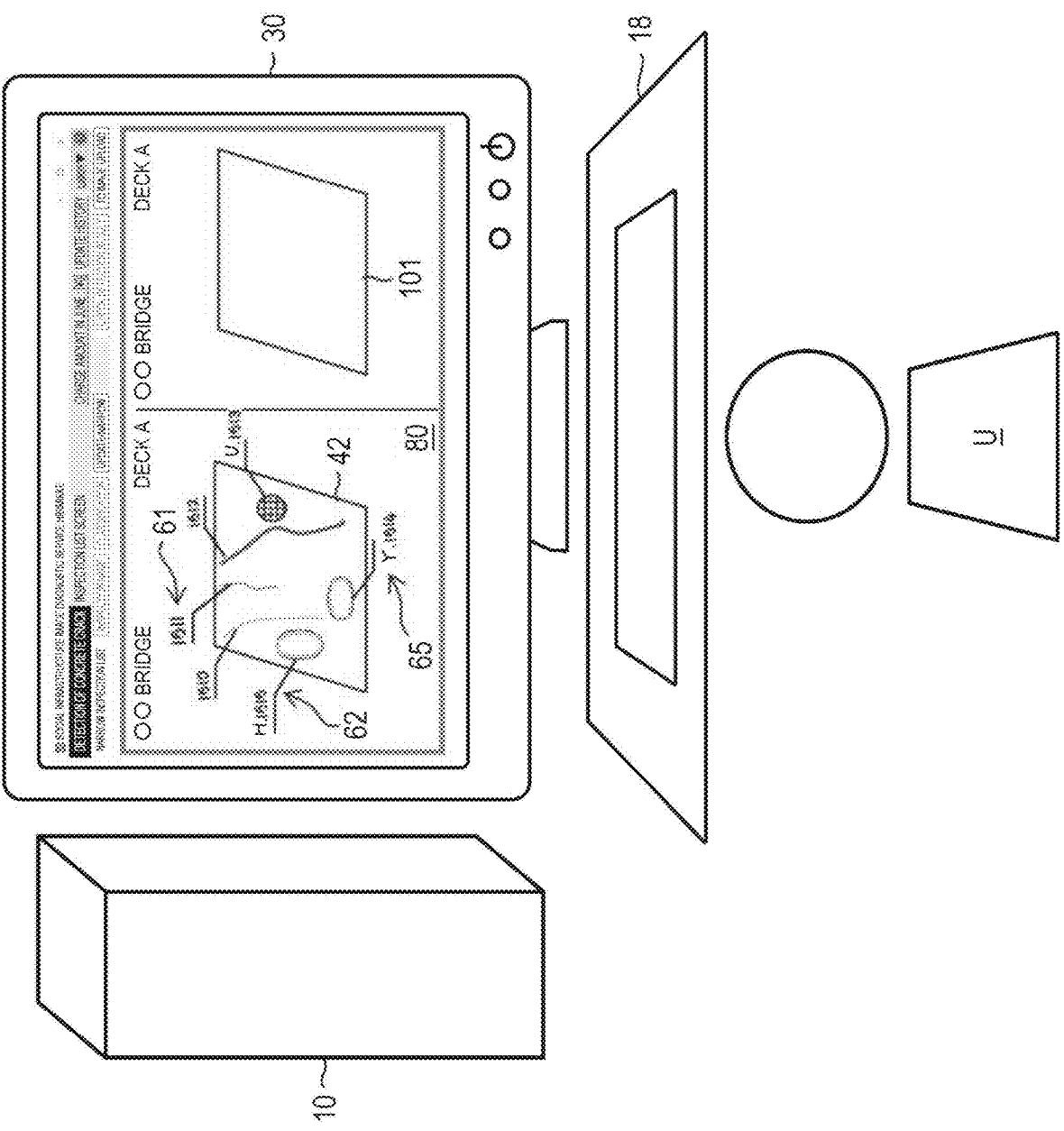
FIG. 15 is a diagram describing processing of acquiring drawing data.

As shown in FIG. 15, the image data 80 and the acquired drawing data 101 can be displayed on the display device 30. The user U can check whether the structural drawing 42 of the image data 80 corresponds to the drawing data 101. In a case where the structural drawing 42 and the drawing data 101 do not correspond to each other, the user U inputs a condition for specifying the target structure from the operation unit 18, and the drawing data acquirer 55 can extract the drawing data 101 to be inspected from the storage 16 in accordance with the condition.

Next, in step S4, the structural drawing 42 of the image data 80 is aligned with the drawing data 101. The aligner 57 of the CPU 20 aligns the structural drawing 42 with the drawing data 101 (step S4).

Figure 16:
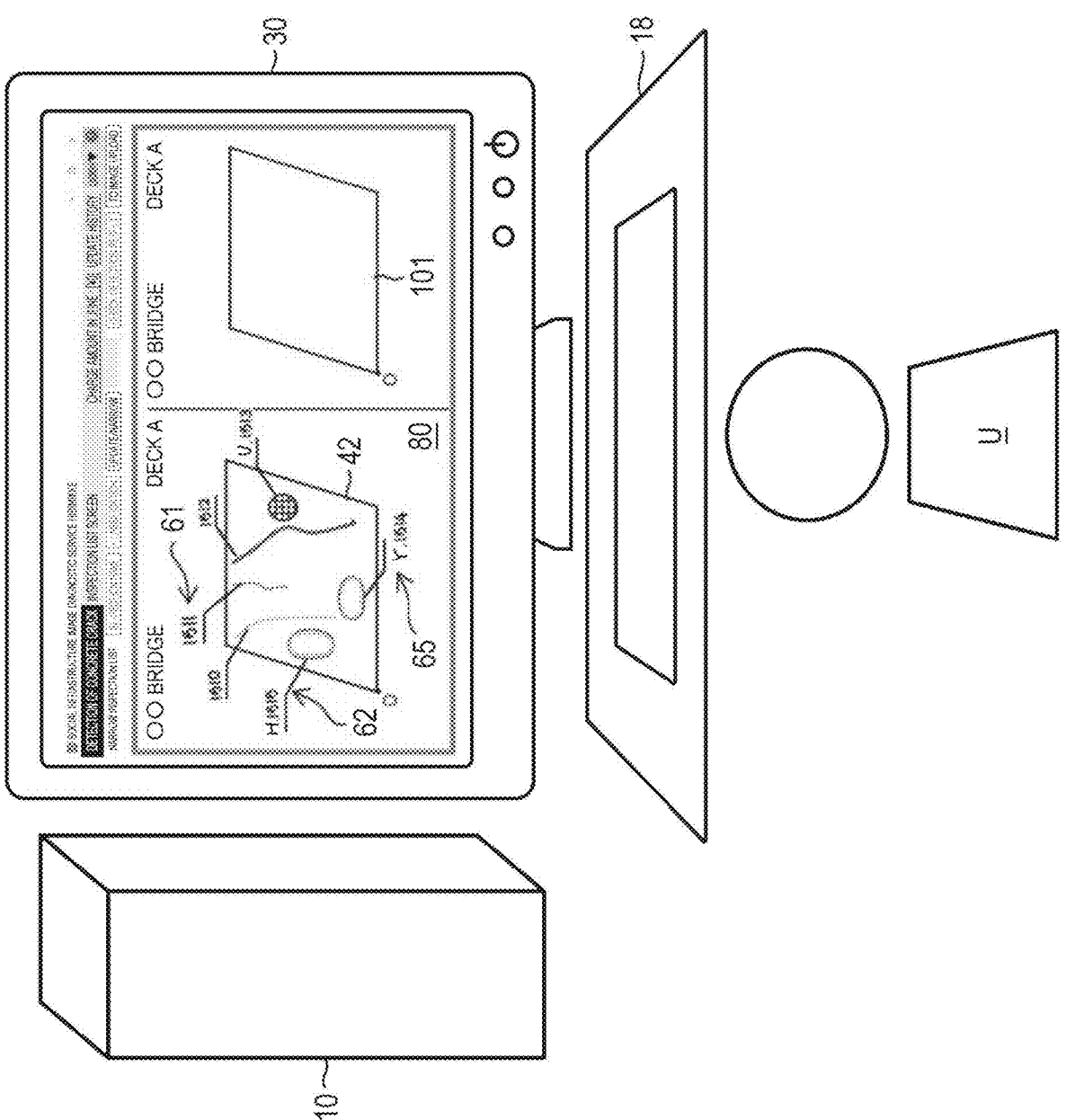
FIG. 16 is a diagram describing processing of aligning the structural drawing with the drawing data.

The aligner 57 sets an origin and a plurality of reference points (for example, a plurality of corners) for the structural drawing 42, and similarly sets an origin O and a plurality of reference points (for example, a plurality of corners) for the drawing data 101. For example, in the structural drawing 42, a lower left corner is set as the origin O, and the remaining three corners are set as the reference points. Similarly, in the drawing data 101, a lower left corner is set as the origin O, and the remaining three corners are set as the reference points. A relative position (direction and distance) from the origin to the reference points in the structural drawing 42 is calculated. Similarly, the relative position (direction and distance) from the origin to the reference point in the drawing data 101 is calculated. As shown in FIG. 16, the relative position from the origin to the reference points of the structural drawing 42 is matched with the relative position from the origin to the reference points of the drawing data 101.

Finally, in step S5, the damage information 60 is drawn as a damage graphic 82 at a corresponding position in the drawing data 101 to create a damage diagram 84. The damage diagram creator 59 of the CPU 20 draws a predetermined line type, color, pattern, or a combination thereof according to the damage information 60 at a corresponding position on the drawing data 101 to create the damage diagram 84 (step S5).

Figure 17:
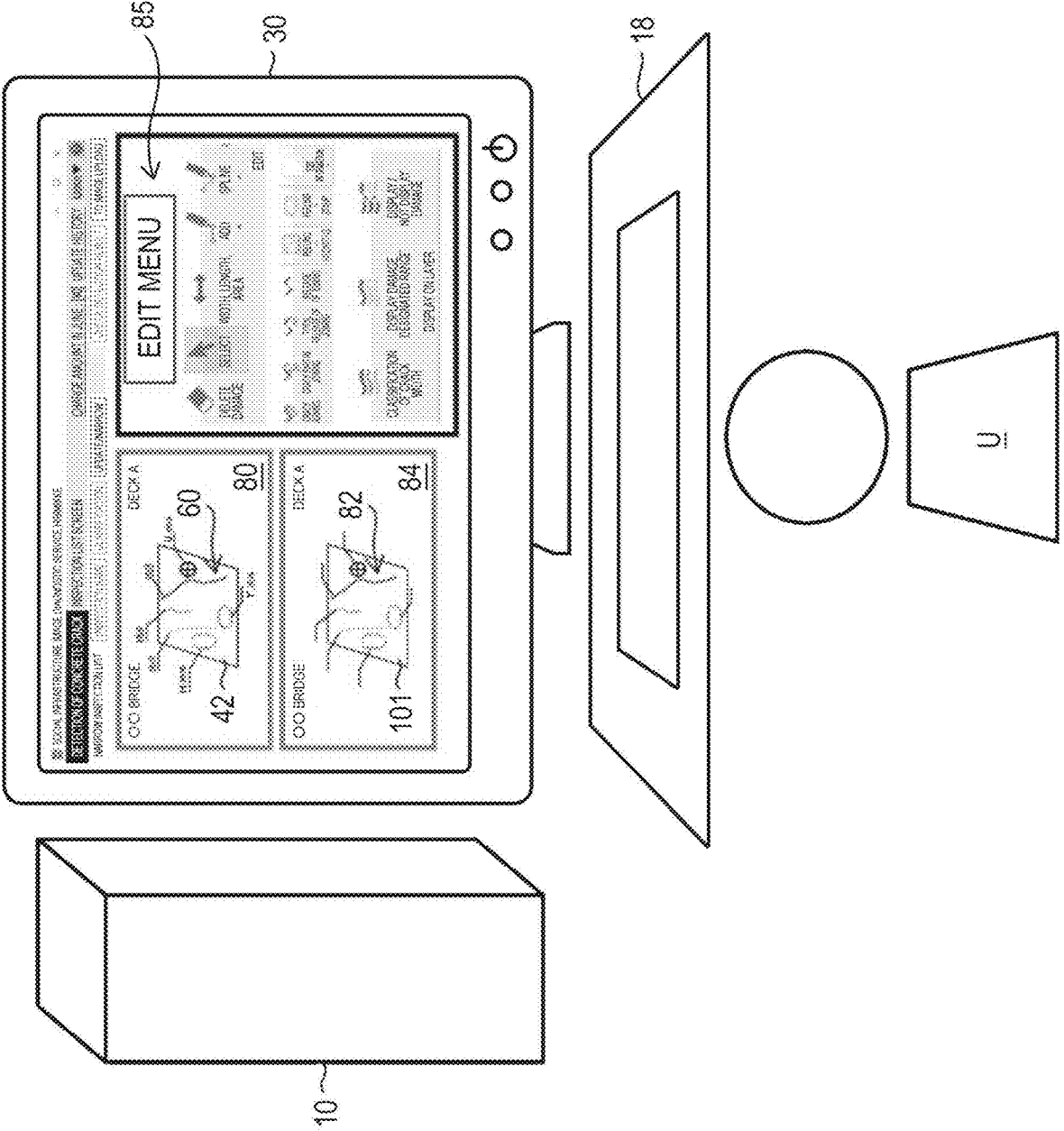
FIG. 17 is a diagram describing processing of creating a damage diagram from the image data.

As shown in FIG. 17, for example, the image data 80 is displayed in an upper left part on the display device 30, and the damage diagram 84 in which the damage graphic 82 is drawn on the drawing data 101 is displayed in a lower left part on the display device 30.

As described above, in step S2, the damage information recognizer 53 recognizes the relative position of the damage information 60 with respect to the structural drawing 42 included in the image data 80. As a result, the position of the damage information 60 can be specified with reference to the structural drawing 42.

In step S4, the structural drawing 42 of the image data 80 is aligned with the drawing data 101. Therefore, by using relative position information of the damage information 60 with respect to the structural drawing 42 recognized by the damage information recognizer 53, the damage graphic 82 corresponding to the damage information 60 can be drawn on the drawing data 101.

The damage graphic 82 can be drawn on the drawing data 101 by tracing the damage information 60 based on the attribute information of the damage information recognizer 53. The damage graphic 82 can be drawn by vectorizing or polygonizing the recognized damage information 60. The vectorization can be drawn as a line drawing indicating a start and an end of the damage.

The damage graphic 82 is added to the drawing data 101 as damage graphic data, and the damage diagram 84 including the damage graphic data and the drawing data 101 is created. The damage diagram 84, which includes the damage graphic data and the drawing data 101, can be printed on a paper medium from the printing device 32. The damage diagram 84 is output as electronic data (damage diagram data) and is stored in the storage 16. The damage diagram 84 can be used as the past damage information 105 at the time of the next periodic inspection.

The damage diagram creator 59 of the CPU 20 calculates the actual dimension of the damage from the damage graphic 82 and the dimension information included in the drawing data 101.

As described above, the damage graphic 82 is drawn in the drawing data 101 having actual size information of the target structure based on the length of the line drawing or the size of the region recognized from the damage information 60. Therefore, the actual size of the damage can be calculated from a correspondence relationship between the actual size information and the damage graphic 82, and can be converted into more accurate actual size information for the damage graphic 82.

As shown in FIG. 17, the damage diagram 84 can be automatically created by the inspection support device 10 from the image data 80 of the inspection memo 48 read by the scanning device 33. As shown on the right side of the display device 30, the user U can edit, add, and delete the damage diagram 84 from an edit menu 85.

Next, a banner function will be described with reference to FIG. 18. The decided damage diagram 84 is displayed on the display device 30. The damage diagram 84 includes the damage graphic 82 and the drawing data 101.

The damage diagram creator 59 of the CPU 20 automatically puts up a banner on the damage graphic 82 of the decided damage diagram 84. The damage diagram creator 59 displays the character string related to the line type or the pattern recognized from the damage information 60 by the damage information recognizer 53 in association with the damage graphic 82. For example, a character string (for example, a type, a size, a degree of damage, or a combination thereof) indicating an attribute is displayed in association with the position and the shape of the damage graphic 82. Alternatively, at least one of the attributes (expressed by a difference in color or line type) is displayed for the position and the shape of the damage graphic 82, and the remaining attributes or all the attributes are displayed in association with character strings. By a difference in color or pattern of the line representing the damage information 60, a difference in type or size of the damage can be expressed in the damage graphic 82. By preparing a database of correspondence relationships (for example, a relationship between a color and a width of a line, a relationship between a sketch and a regional damage, and the like) in advance and interpreting the meaning of the line representing the damage information 60 from the correspondence relationships, the line can be expressed by replacing with a character string. The database of the correspondence relationships can be edited.

Figure 18:
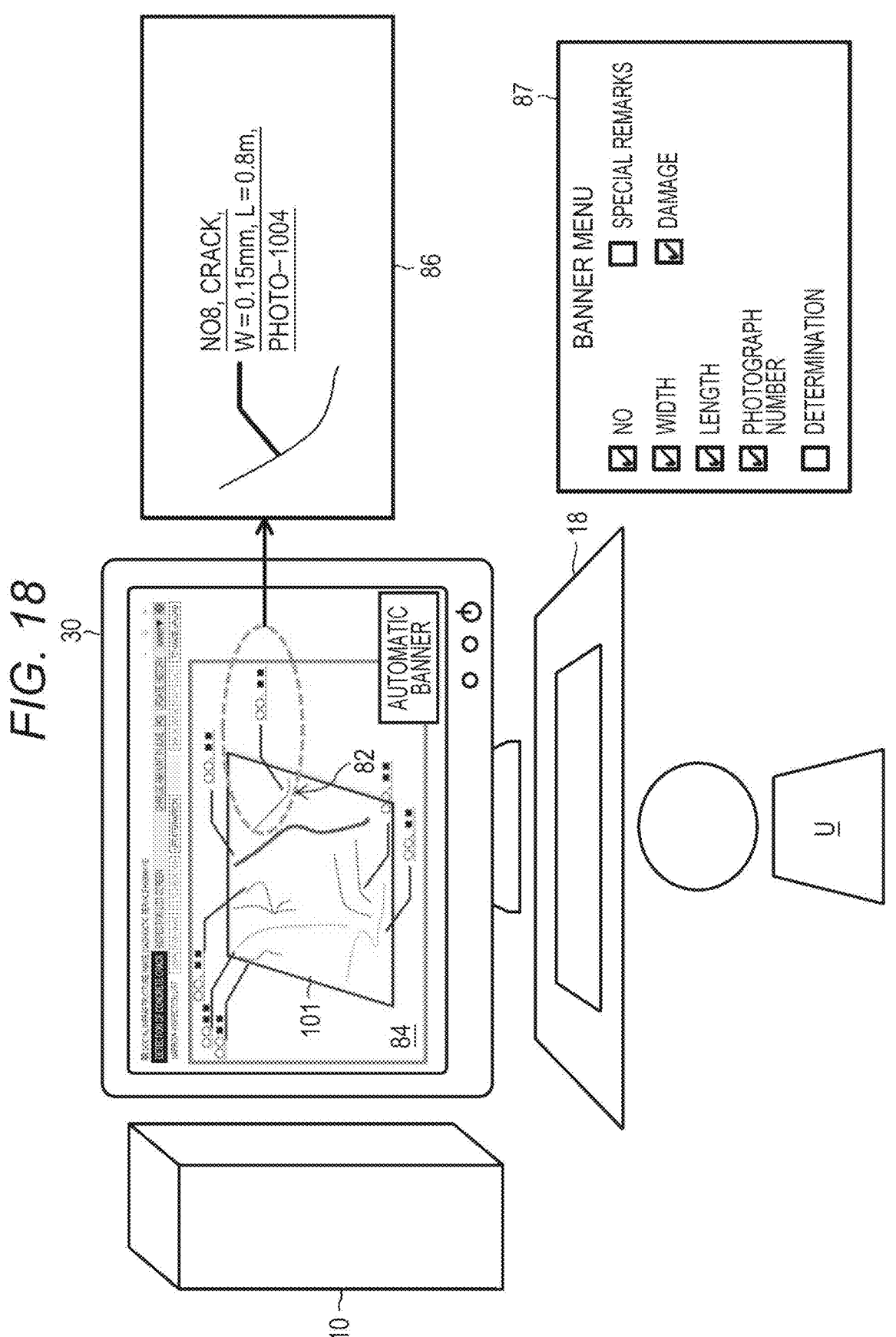
FIG. 18 is a diagram describing processing of putting up a banner on the damage diagram.

FIG. 18 shows an example of putting up a banner on one damage graphic 82. In a banner display 86, a character string related to the attribute recognized from the damage information 60 is displayed. The banner display 86 includes a damage number "N08" determined arbitrarily, a damage type "crack", "W=0.15 mm, a damage size L=0.8 m", and a photograph number "photo-1004" determined arbitrarily.

The user U can edit, add, and delete at a banner menu 87. The edited result is reflected on the damage diagram data of the damage diagram 84 in real time.

Figure 19:
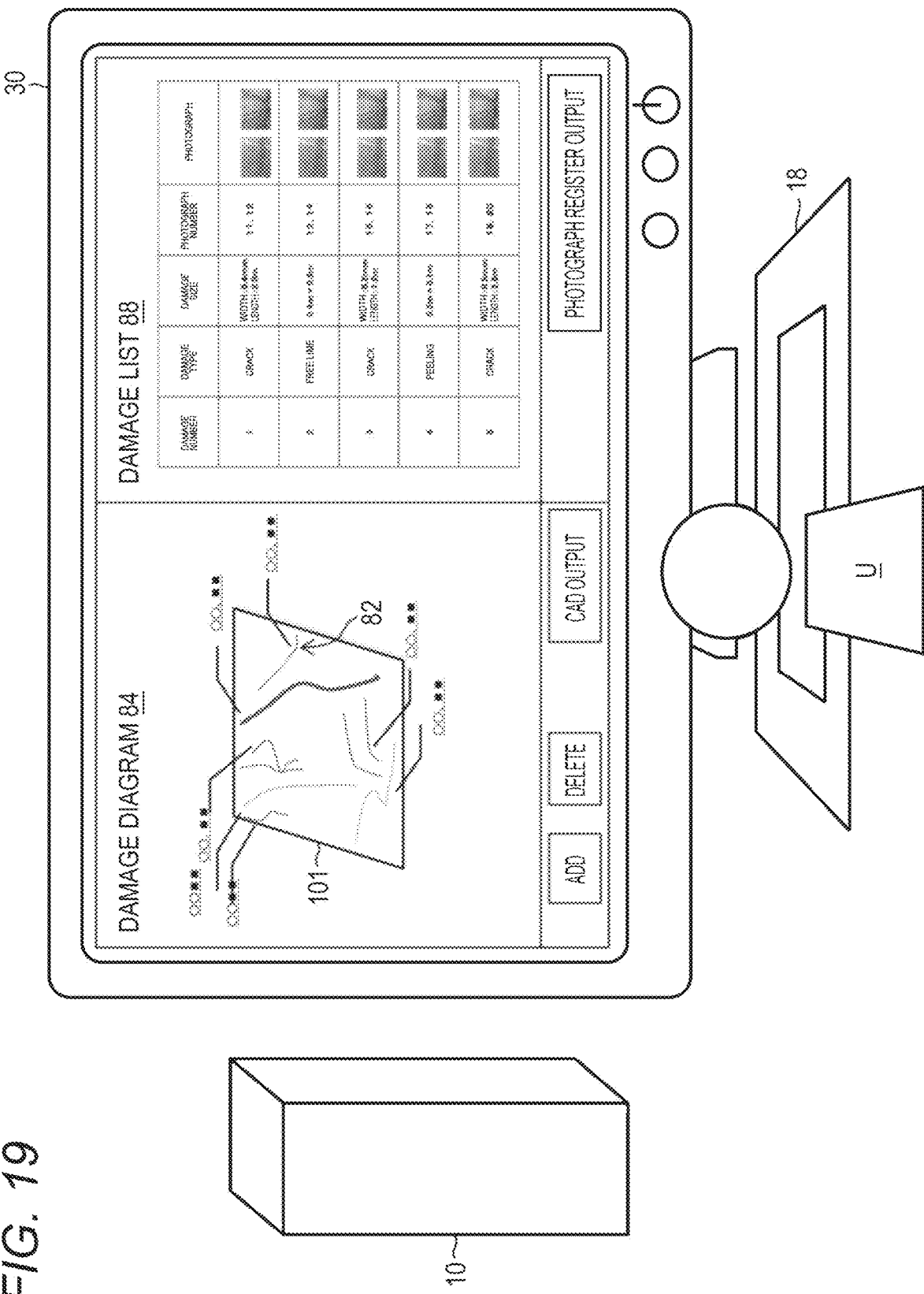
FIG. 19 is a diagram for describing editing using the damage diagram and a damage list.

Next, editing using the damage diagram 84 and a damage list 88 will be described with reference to FIG. 19. As shown in FIG. 19, the damage diagram 84 and the damage list 88 are simultaneously displayed on the display device 30. The contents of the attributes of the damage in the damage diagram 84 and the damage list 88 are synchronized. For example, the banner display 86 of a damage number 1 in the damage diagram 84 matches a damage number 1 on the damage list 88, and both display "crack". Similarly, the damage size on the banner display 86 matches the damage size on the damage list 88.

The user U can add the damage graphic 82 to the damage diagram 84 by operating an add button. The damage graphic 82 that can be added includes a "crack" and regional damage (peeling, free lime, and the like). In a case where the damage graphic 82 is added, the damage graphic 82 is reflected in the damage list 88, and a new damage number and damage content are added. The user U can delete the damage graphic 82 of the damage diagram 84 by operating a delete button.

The user U can correct, add, and delete any of the content of the banner display 86 and the content of the damage list 88 in the damage diagram 84 by editing. Since the damage diagram 84 and the damage list 88 are synchronized with each other, in a case where one of them is edited, an edited content is reflected on the other.

The user U can output the damage diagram 84 in CAD and can select an output destination. For example, the data can be output as electronic data in the form of the printing device 32 or a general-purpose image format. In addition, the user U can output the damage list 88 in a table format of a predetermined format. For example, here, the damage list 88 is output in the form of a photograph register.

The inspection support device according to the embodiment can draw a difference between the damage information 60 and the past damage information 105 as the damage graphic 82 based on the past damage information 105 of the target structure in the past and the current damage information 60.

Figure 20:
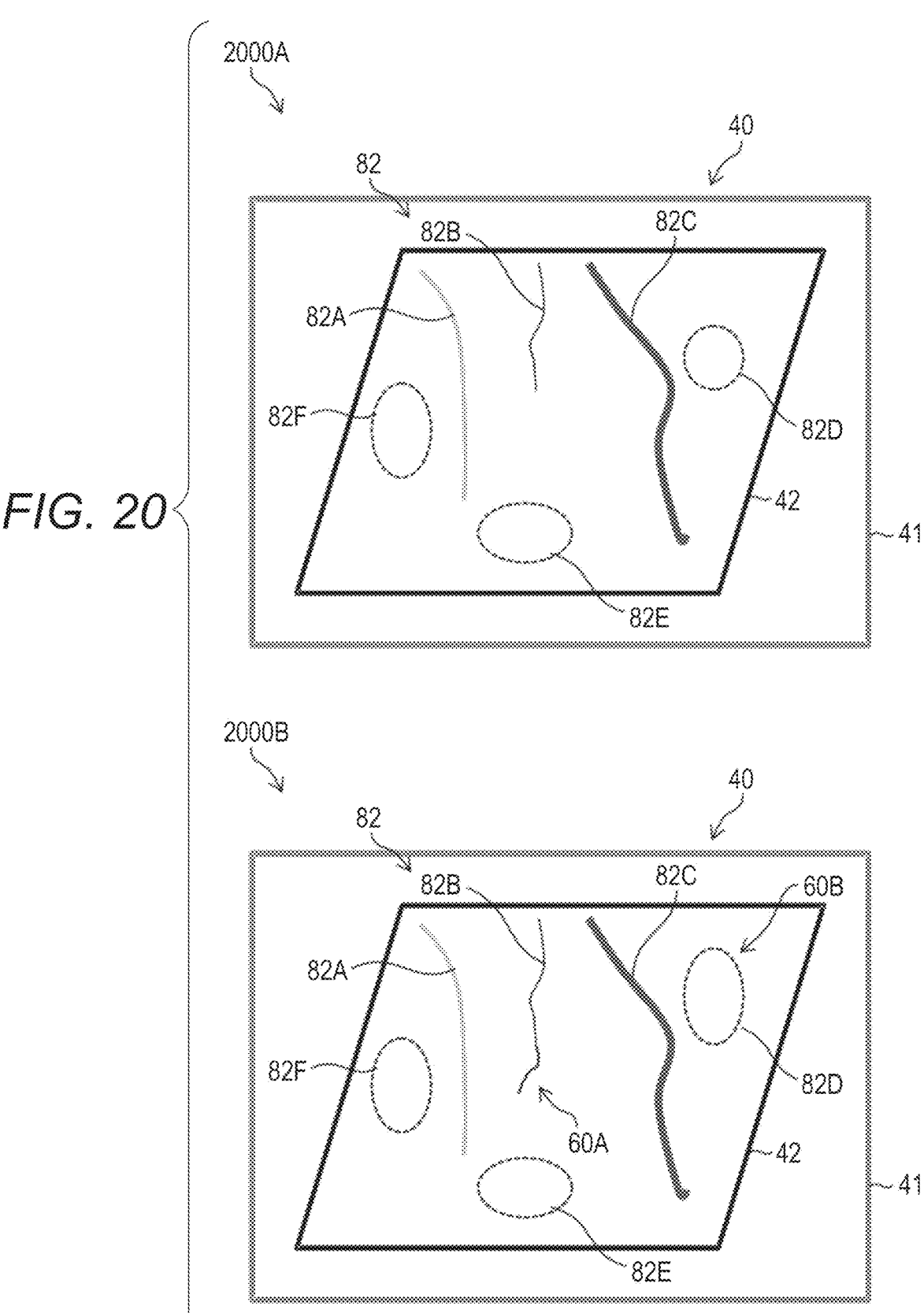
FIG. 20 is a diagram describing processing of drawing a difference as a damage graphic by using past damage information and current damage information.

As shown in 2000A in FIG. 20, the user U (not shown) creates the field notebook 40 by printing the structural drawing 42 and the damage graphic 82 (82A, 82B, 82C, 82D, 82E, and 82F) corresponding to the drawing data 101 on the paper medium 41 based on the past damage information 105.

As shown in 2000B, the user U confirms the state of the bridge which is the structure 70 to be inspected by visual appearance inspection at the inspection site while holding the field notebook 40 and the pen 43. The user U adds damage information 60 (60A and 60B) related to damage 77 of the structure 70 obtained by visual appearance inspection to the paper medium 41 of the field notebook 40 by handwriting with the pen 43.

The damage diagram 84 of the field notebook 40 after inspection is created in accordance with the flow shown in FIG. 4. In this case, the damage diagram creator 59 adds the damage graphic 82 corresponding to the current damage information 60 (60A and 60B) to the past damage information 105 as a difference.

By adding the difference for each periodic inspection, the progress of damage to the structure 70 can be easily confirmed.

Others

In the embodiment described above, hardware structures of the processing units that execute various processing are various processors as follows. The various processors include a central processing unit (CPU) which is a general-purpose processor functioning as various processing units by executing software (program), a programmable logic device (PLD) which is a processor such as a field programmable gate array (FPGA) capable of changing a circuit configuration after manufacturing, a dedicated electric circuit which is a processor such as an application specific integrated circuit (ASIC) having a circuit configuration exclusively designed to execute specific processing, and the like.

One processing unit may be configured by one of these various processors, or may be configured by two or more processors (for example, a plurality of FPGAs or a combination of a CPU and an FPGA) of the same type or different types. In addition, the plurality of processing units can be configured by one processor. As an example in which the plurality of processing units are configured by one processor, first, as typified by a computer such as a client, a server, or the like, there is a form in which one processor is configured by a combination of one or more CPUs and software and this processor functions as the plurality of processing units. Second, as typified by a system on chip (SoC) and the like, there is a form of using a processor that implements the functions of the entire system including a plurality of processing units with one integrated circuit (IC) chip. As described above, the various processing units are configured by using one or more of the various processors as a hardware structure.

Further, the hardware structure of these various processors is, more specifically, an electric circuit (circuitry) in which circuit elements such as semiconductor elements are combined.

Each of the above configurations and functions can be appropriately implemented by any hardware, software, or a combination of both. For example, the present invention can be applied to a program that causes a computer to execute the above processing steps (processing procedure), a computer-readable recording medium (non-transitory recording medium) in which such a program is recorded, or a computer in which such a program can be installed.

Although examples of the present invention have been described above, the present invention is not limited to the embodiments described above, and various modifications can be made without departing from the gist of the present invention.

EXPLANATION OF REFERENCES

10: inspection support device
12: input and output interface
16: storage
18: operation unit
26: display controller
30: display device
32: printing device
33: scanning device
40: field notebook
40A: field notebook
41: paper medium
42: structural drawing
43: pen
45: digital camera
46: electronic medium
47: electronic pen
48: inspection memo
51: image data acquirer
53: damage information recognizer
55: drawing data acquirer
57: aligner
59: damage diagram creator
60: damage information
60A: damage information
60B: damage information
60C: damage information
60D: damage information
60E: damage information
60F: damage information
61: captured image identification information
61A: captured image identification information
61B: captured image identification information
61C: captured image identification information
61D: captured image identification information
61E: captured image identification information
61F: captured image identification information
61G: captured image identification information
61H: captured image identification information
61I: captured image identification information
61J: captured image identification information
61K: captured image identification information
61L: captured image identification information
62: association information
62A: association information
62B: association information
62C: association information
62D: association information
62E: association information
62F: association information
63: association information
63A: association information
63B: association information
63C: association information
63D: association information
63E: association information
63F: association information
64: auxiliary information

20

64A: auxiliary information
64B: auxiliary information
64C: auxiliary information
64D: auxiliary information
64E: auxiliary information
64F: auxiliary information
65: additional attribute information
65A: additional attribute information
65B: additional attribute information
65C: additional attribute information
67: additional attribute information
67A: additional attribute information
67B: additional attribute information
67C: additional attribute information
67D: additional attribute information
67E: additional attribute information
67F: additional attribute information
70: structure
71: bridge
72: main girder
73: cross girder
74: cross frame
75: lateral frame
76: deck
77: damage
80: image data
82: damage graphic
84: damage diagram
85: edit menu
86: banner display
87: banner menu
88: damage list
101: drawing data
103: captured image
105: past damage information

What is claimed is:

1. An inspection support device comprising a processor that supports creation of a damage diagram of a structure, wherein the processor
acquires image data including a structural drawing of a target structure on a medium and damage information related to damage added by a user on the medium,
recognizes the damage information by image recognition from the acquired image data,
acquires drawing data corresponding to the structural drawing,
aligns the structural drawing of the image data with the drawing data,
draws the damage information as a damage graphic at a corresponding position of the drawing data to create the damage diagram, and
calculates an actual dimension of the damage from the damage graphic and dimension information included in the drawing data.

2. The inspection support device according to claim 1, wherein the processor associates the damage graphic with a character string.

3. The inspection support device according to claim 1, wherein the processor receives editing of the created damage diagram and permits the editing of the damage diagram.

4. The inspection support device according to claim 1, wherein the processor vectorizes and draws the damage graphic.

5. The inspection support device according to claim 1, wherein the processor recognizes the damage information from the image data by the image recognition by at least one of a machine learning model or an image recognition algorithm.

6. The inspection support device according to claim 1, wherein the processor recognizes additional attribute information regarding the damage information from the image data by character recognition.

7. The inspection support device according to claim 6, wherein the processor associates the damage information with the additional attribute information based on a predetermined condition.

8. The inspection support device according to claim 6, wherein the image data includes auxiliary information that specifies the additional attribute information, and the processor specifies a position of the additional attribute information based on the auxiliary information.

9. The inspection support device according to claim 1, wherein the image data includes captured image identification information of a captured image obtained by imaging the target structure, and the processor acquires the captured image from the captured image identification information, and acquires complementary information that complements the damage information from the captured image.

10. The inspection support device according to claim 1, wherein past damage information of the target structure in the past is included on the medium, and the processor draws a difference between the damage information and the past damage information as the damage graphic based on the damage information and the past damage information.

11. An inspection support method of supporting creation of a damage diagram of a structure by a processor, the inspection support method comprising:

by the processor, a step of acquiring image data of information including a structural drawing of a target structure on a medium and damage information added by a user on the medium;

a step of recognizing the damage information from the acquired image data;

a step of acquiring drawing data corresponding to the structural drawing;

a step of aligning the structural drawing of the image data with the drawing data;

a step of drawing the damage information as a damage graphic at a corresponding position of the drawing data to create the damage diagram; and a step of calculating an actual dimension of the damage from the damage graphic and dimension information included in the drawing data.

12. A non-transitory, computer-readable tangible recording medium which records thereon a program that causes, when read by a computer, a processor of the computer to execute an inspection support method of supporting creation of a damage diagram of a structure, the program causing the processor to execute:

a step of acquiring image data of information including a structural drawing of a target structure on a medium and damage information added by a user on the medium;

a step of recognizing the damage information from the acquired image data;

a step of acquiring drawing data corresponding to the structural drawing;

a step of aligning the structural drawing of the image data with the drawing data; a step of drawing the damage information as a damage graphic at a corresponding position of the drawing data to create a damage diagram; and a step of calculating an actual dimension of the damage from the damage graphic and dimension information included in the drawing data.

13. An inspection support device comprising a processor that supports creation of a damage diagram of a structure, wherein the processor acquires image data including a structural drawing of a target structure on a medium and damage information related to damage added by a user on the medium, recognizes the damage information by image recognition from the acquired image data, acquires drawing data corresponding to the structural drawing, aligns the structural drawing of the image data with the drawing data, draws the damage information as a damage graphic at a corresponding position of the drawing data to create the damage diagram, recognizes additional attribute information regarding the damage information from the image data by character recognition, wherein the image data includes auxiliary information that specifies the additional attribute information, and specifies a position of the additional attribute information based on the auxiliary information.

14. The inspection support device according to claim 13, wherein the processor associates the damage graphic with a character string.

15. The inspection support device according to claim 13, wherein the processor receives editing of the created damage diagram and permits the editing of the damage diagram.

16. The inspection support device according to claim 13, wherein the processor vectorizes and draws the damage graphic.

17. The inspection support device according to claim 13, wherein the processor recognizes the damage information from the image data by the image recognition by at least one of a machine learning model or an image recognition algorithm.

18. The inspection support device according to claim 13, wherein the processor associates the damage information with the additional attribute information based on a predetermined condition.

19. The inspection support device according to claim 13, wherein the image data includes captured image identification information of a captured image obtained by imaging the target structure, and the processor acquires the captured image from the captured image identification information, and acquires complementary information that complements the damage information from the captured image.

20. The inspection support device according to claim 13, wherein past damage information of the target structure in the past is included on the medium, and the processor draws a difference between the damage information and the past damage information as the damage graphic based on the damage information and the past damage information.

21. An inspection support device comprising a processor that supports creation of a damage diagram of a structure, wherein the processor acquires image data including a structural drawing of a target structure on a medium and damage information related to damage added by a user on the medium, recognizes the damage information by image recognition from the acquired image data, acquires drawing data corresponding to the structural drawing, aligns the structural drawing of the image data with the drawing data, draws the damage information as a damage graphic at a corresponding position of the drawing data to create the damage diagram, wherein the image data includes captured image identification information of a captured image obtained by imaging the target structure, and acquires the captured image from the captured image identification information, and acquires complementary information that complements the damage information from the captured image.

22. The inspection support device according to claim 21, wherein the processor associates the damage graphic with a character string.

23. The inspection support device according to claim 21, wherein the processor receives editing of the created damage diagram and permits the editing of the damage diagram.

24. The inspection support device according to claim 21, wherein the processor vectorizes and draws the damage graphic.

25. The inspection support device according to claim 21, wherein the processor recognizes the damage information from the image data by the image recognition by at least one of a machine learning model or an image recognition algorithm.

26. The inspection support device according to claim 21, wherein the processor recognizes additional attribute information regarding the damage information from the image data by character recognition.

27. The inspection support device according to claim 26, wherein the processor associates the damage information with the additional attribute information based on a predetermined condition.

28. The inspection support device according to claim 21, wherein past damage information of the target structure in the past is included on the medium, and the processor draws a difference between the damage information and the past damage information as the damage graphic based on the damage information and the past damage information.

29. An inspection support method of supporting creation of a damage diagram of a structure by a processor, the inspection support method comprising:

by the processor, a step of acquiring image data of information including a structural drawing of a target structure on a medium and damage information added by a user on the medium;

a step of recognizing the damage information from the acquired image data;

a step of acquiring drawing data corresponding to the structural drawing;

a step of aligning the structural drawing of the image data with the drawing data;

a step of drawing the damage information as a damage graphic at a corresponding position of the drawing data to create the damage diagram;

a step of recognizing additional attribute information regarding the damage information from the image data by character recognition, wherein the image data includes auxiliary information that specifies the additional attribute information; and a step of specifying a position of the additional attribute information based on the auxiliary information.

30. An inspection support method of supporting creation of a damage diagram of a structure by a processor, the inspection support method comprising:

by the processor, a step of acquiring image data of information including a structural drawing of a target structure on a medium and damage information added by a user on the medium;

a step of recognizing the damage information from the acquired image data;

a step of acquiring drawing data corresponding to the structural drawing;

a step of aligning the structural drawing of the image data with the drawing data;

a step of drawing the damage information as a damage graphic at a corresponding position of the drawing data to create the damage diagram, wherein the image data includes captured image identification information of a captured image obtained by imaging the target structure;

acquires the captured image from the captured image identification information; and acquires complementary information that complements the damage information from the captured image.

31. A non-transitory, computer-readable tangible recording medium which records thereon a program that causes, when read by a computer, a processor of the computer to execute an inspection support method of supporting creation of a damage diagram of a structure, the program causing the processor to execute:

a step of acquiring image data of information including a structural drawing of a target structure on a medium and damage information added by a user on the medium;

a step of recognizing the damage information from the acquired image data;

a step of acquiring drawing data corresponding to the structural drawing;

a step of aligning the structural drawing of the image data with the drawing data;

a step of drawing the damage information as a damage graphic at a corresponding position of the drawing data to create a damage diagram;

a step of recognizing additional attribute information regarding the damage information from the image data by character recognition, wherein the image data includes auxiliary information that specifies the additional attribute information; and a step of specifying a position of the additional attribute information based on the auxiliary information.

32. A non-transitory, computer-readable tangible recording medium which records thereon a program that causes, when read by a computer, a processor of the computer to execute an inspection support method of supporting creation of a damage diagram of a structure, the program causing the processor to execute:

a step of acquiring image data of information including a structural drawing of a target structure on a medium and damage information added by a user on the medium;

a step of recognizing the damage information from the acquired image data;

a step of acquiring drawing data corresponding to the structural drawing;

a step of aligning the structural drawing of the image data with the drawing data;

a step of drawing the damage information as a damage graphic at a corresponding position of the drawing data to create a damage diagram, wherein the image data includes captured image identification information of a captured image obtained by imaging the target structure;

a step of acquiring the captured image from the captured image identification information; and a step of acquiring complementary information that complements the damage information from the captured image.

*     *     *     *     *